(12) United States Patent
Periyalwar et al.

(10) Patent No.: US 8,478,283 B2
(45) Date of Patent: Jul. 2, 2013

(54) METHOD AND SYSTEM FOR CAPACITY AND COVERAGE ENHANCEMENT IN WIRELESS NETWORKS WITH RELAYS

(75) Inventors: Shalini Periyalwar, Ottawa (CA); Omer Mubarek, Ottawa (CA); Halim Yanikomeroglu, Ottawa (CA)

(73) Assignee: Apple Inc., Cupertino, CA (US)

( * ) Notice: Subject to any disclaimer, the term of this patent is extended or adjusted under 35 U.S.C. 154(b) by 814 days.

(21) Appl. No.: 11/664,135

(22) PCT Filed: Sep. 29, 2005

(86) PCT No.: PCT/CA2005/001475
§ 371 (c)(1),
(2), (4) Date: Feb. 26, 2008

(87) PCT Pub. No.: WO2006/034578
PCT Pub. Date: Apr. 6, 2006

(65) Prior Publication Data
US 2008/0260000 A1 Oct. 23, 2008

Related U.S. Application Data

(60) Provisional application No. 60/614,217, filed on Sep. 29, 2004.

(51) Int. Cl.
*H04W 72/00* (2009.01)
(52) U.S. Cl.
USPC .......... 455/452.1; 455/450; 370/329; 375/132
(58) Field of Classification Search
USPC ............... 455/422.1, 452.2, 454, 63.1, 63.3, 455/67.11, 71, 427–431, 445–451, 452.1, 455/464, 509, 62; 370/315–317, 329, 341, 370/437
See application file for complete search history.

(56) References Cited

U.S. PATENT DOCUMENTS

| | | | |
|---|---|---|---|
| 5,394,433 A * | 2/1995 | Bantz et al. ................ 375/132 |
| 5,898,679 A * | 4/1999 | Brederveld et al. .......... 370/315 |
| 5,936,964 A | 8/1999 | Valko et al. |
| 6,259,677 B1 | 7/2001 | Jain |
| 6,351,643 B1 * | 2/2002 | Haartsen .................... 455/450 |
| 6,430,160 B1 | 8/2002 | Smith et al. |
| 6,480,505 B1 * | 11/2002 | Johansson et al. .......... 370/449 |
| 6,501,785 B1 * | 12/2002 | Chang et al. ................ 375/133 |
| 6,526,279 B1 * | 2/2003 | Dent ........................... 455/437 |
| 6,549,784 B1 * | 4/2003 | Kostic et al. ................ 455/501 |

(Continued)

OTHER PUBLICATIONS

"International Search Report" for International Application No. PCT/CA2005/001475, mailed Jan. 24, 2006, 4 pages.

(Continued)

*Primary Examiner* — Jinsong Hu
*Assistant Examiner* — Magdi Elhag
(74) *Attorney, Agent, or Firm* — Meyertons, Hood, Kivlin, Kowert & Goetzel, P.C.; Eric B. Meyertons

(57) ABSTRACT

A method and system for capacity and coverage enhancement in wireless networks is provided. Each cell has a base station and in-cell relay stations. The base station includes interference avoidance/averaging mechanism, dynamic resource partitioning mechanism or a combination thereof. The interference avoidance/averaging mechanism dynamically creating a FH pattern based on interference information obtained from its serving cell. The base station may include a scheduler for dynamic resource partitioning mechanism for managing scheduling in the cell.

19 Claims, 17 Drawing Sheets

U.S. PATENT DOCUMENTS

| | | | |
|---|---|---|---|
| 6,567,415 B1 | 5/2003 | Elwalid et al. | |
| 6,574,223 B1* | 6/2003 | Brueckheimer et al. | 370/395.6 |
| 6,590,928 B1 | 7/2003 | Haartsen | |
| 6,647,053 B1* | 11/2003 | Garces | 375/132 |
| 6,751,194 B1 | 6/2004 | Ueno | |
| 6,771,598 B1 | 8/2004 | Andrews | |
| 6,804,521 B2 | 10/2004 | Tong et al. | |
| 6,826,409 B2* | 11/2004 | Kostic et al. | 455/501 |
| 7,006,823 B2* | 2/2006 | Shurvinton et al. | 455/422.1 |
| 7,218,891 B2 | 5/2007 | Periyalwar et al. | |
| 7,333,514 B2* | 2/2008 | Anehem et al. | 370/474 |
| 7,453,832 B2* | 11/2008 | Steer et al. | 370/278 |
| 7,590,064 B1 | 9/2009 | Zhang et al. | |
| 7,646,752 B1 | 1/2010 | Periyalwar et al. | |
| 7,962,095 B2 | 6/2011 | Periyalwar et al. | |
| 2002/0141452 A1 | 10/2002 | Mauritz et al. | |
| 2002/0154607 A1* | 10/2002 | Forstadius et al. | 370/311 |
| 2002/0167911 A1 | 11/2002 | Hickey | |
| 2005/0185651 A1 | 8/2005 | Rinne | |
| 2005/0281278 A1 | 12/2005 | Black et al. | |
| 2006/0239204 A1 | 10/2006 | Bordonaro et al. | |
| 2007/0019552 A1 | 1/2007 | Senarath et al. | |
| 2007/0089147 A1 | 4/2007 | Urdang et al. | |

OTHER PUBLICATIONS

"International Preliminary Report on Patentability" for International Application No. PCT/CA2005/001475, mailed Apr. 3, 2007, 7 pages.

Yang, "Asynchronous Fast Frequency-Hopping CDMA Cellular Systems", IEEE Transactions on Vehicular Technology, vol. 45, No. 4, Nov. 1996, pp. 676-682.

Bolukbasi et al. "On the Capacity of Cellular Fixed Relay Networks", CCECE 2004, Niagara Falls, May 2004, pp. 2217-2220.

U.S. Patent and Trademark Office, "Communication" for co-pending U.S. Appl. No. 11/432,476, mailed Jul. 9, 2012, available in USPTO Patent Application Information Retrieval database.

U.S. Patent and Trademark Office, "Communication" for co-pending U.S. Appl. No. 11/432,476, mailed Jan. 31, 2012, available in USPTO Patent Application Information Retrieval database.

* cited by examiner

METHOD AND SYSTEM FOR CAPACITY AND COVERAGE ENHANCEMENT IN WIRELESS NETWORKS WITH RELAYS

PRIORITY CLAIM

This application is a National Stage filing under 35 U.S.C. §371 of International Application No. PCT/CA05/01475 entitled "METHOD AND SYSTEM FOR CAPACITY AND COVERAGE ENHANCEMENT IN WIRELESS NETWORKS WITH RELAYS" to Periyalwar et al., filed Sep. 29, 2005, which claims priority to U.S. Provisional Patent Application No. 60/614,217 entitled "METHOD AND SYSTEM FOR DYNAMIC FREQUENCY HOPPING WITH LIMITED INFORMATION IN CELLULAR RELAY NETWORKS" to Periyalwar et al., filed Sep. 29, 2004.

FIELD OF INVENTION

The present invention relates to network communications, and more specifically to a method and system for resource management in wireless networks.

BACKGROUND OF THE INVENTION

In order to deal with interference problems associated with aggressive channel reuse schemes (such as a channel reuse of one), various interference management/avoidance techniques have been proposed for use in wireless networks.

For example, assuming an interference limited system, frequency diversity and interference averaging can be achieved in a network by exploiting orthogonal frequency hopping such as Cyclic Frequency Hopping (CFH).

In a conventional cellular system, considering downlink, users receive interference from other cells. If no frequency hopping is used, certain user equipment will always receive interference at the same frequency from the same base station. If this interference level is low, the quality of the communication for this user will be acceptable. On the other hand, if the user equipment receives severe interference from a base station, then it will experience an outage.

CFH works by bringing up the performance of user equipment (UE) with poor quality links to an average quality level, while bringing down the performance of UEs communicating on high quality links again to this average. Since the performance of the bottleneck users has increased, there are fewer users experiencing outages, whereas the number of UEs experiencing high quality communication decreases. Cyclic and other forms of orthogonal frequency hopping are described in R. L. Pickholtz et al. ("Theory of Spread Spectrum Communications—A Tutorial", IEEE Trans. Comm. 30(5); 855-884, May 1982).

The fact that it is simple to implement and appropriate for providing robust communications links in interference limited and frequency selective channels, makes CFH the most popular frequency hopping technique in commercial communications systems (e.g. GSM).

Other techniques for dealing with interference require transmission coordination of base stations, which are interferers of each other. However, in many current wireless communication architectures neighboring base stations do not have a wired link between each other. Therefore, information exchange, and hence transmission coordination, is difficult to achieve in a timely fashion among the base stations.

For example, it has been proposed to have an interference management technique called Dynamic Frequency Hopping (DFH) that incorporates a non-traditional Dynamic Channel Allocation (DCA) scheme with slow frequency hopping (Z. Kostic, and N. Sollenberger, "Performance and Implementation of Dynamic Frequency Hopping in Limited-Bandwidth Cellular Systems", IEEE Transactions on Wireless Communications, Vol. 1, No. 1, January 2002).

The main objective of DFH is to provide capacity improvements through the addition of interference avoidance, which are higher than those provided by conventional frequency hopping, while preserving interference averaging characteristics of conventional frequency hopping in order to provide robustness to changes in interference.

For generic cellular systems, with frequency reuse of one, Wang et al. and Kostic et al. have shown that implementing interference avoidance on top of frequency hopping can result in considerable capacity improvements (Wang et al., "Analysis of Frequency-Hopped Cellular Systems with Dynamic FH Pattern Adaptation", in Communication Theory Mini-Conference, IEEE Globecom, 1998, Sydney: Kostic et al., "Dynamic Frequency Hopping in Wireless Cellular Systems—Simulations of Full-Replacement and Reduced-Overhead Methods", in Proceedings of the IEEE VTC'99, vol. 2, pp. 914-918, May, 1999, Houston).

DFH is based on adjusting or creating frequency hopping patterns based on interference measurements. This technique combines traditional frequency hopping with dynamic channel assignment (DCA), where a channel is one frequency in a frequency hop pattern. The continuous modification of frequency hop patterns based on measurements represents an application of DCA to slow frequency hopping. However, the fact that only some subset of frequencies in the whole FH pattern is replaced by a better quality subset makes this a non-traditional DCA scheme. The modifications are based on rapid interference measurements and calculations of the quality of frequencies used in a system by all mobile stations and base stations. The measurements of all frequencies can be done in practice in traditional Time Division Multiple Access (TDMA) systems at lower speeds or if orthogonal frequency division multiplexing (OFDM) is used.

Two main practical problems with conventional DFH are the need to perform rapid interference measurements at all relevant frequencies, both at the mobiles and the base stations; and the signaling overhead required to communicate the measurement results to the base station.

Using real time inter-base signaling for inter-cell interference management and taking advantage of frame synchronization on a system level, an alternative and practical version of DFH finds a solution for these bottlenecks. This technique is called Dynamic Frequency Hopping with Network Assisted Resource Allocation (DFH with NARA). The feature of this technique is that it benefits from frame synchronization on a system level and provides functionality identical to that of the measurement-based DFH.

FIG. 1 illustrates a conventional system structure, where NARA is used for downlink DFH implementation. The system of FIG. 1 includes a conventional mobile station (MS) and base station (BS), with some added functionality. At the MS, the additional functions include pathloss measurements (10) on the frequencies of interest, transmission (12) of the measurement results and the use (14) of a specified FH pattern assigned by the BS. At the BS, the additional functions include the collection (20) of all measurements from the MSs within the BS coverage area, obtaining (22) a local copy of measurements from all MSa at all BSs, processing (24) these measurements along with copies (26) of the existing FH patterns from all BSs in order to identify FH patterns for the given BS, transmitting (28) the FH patterns or the incremental changes in these patterns to the MSs.

FIGS. 2-4 show exemplary operations of FIG. 1. In FIG. 4, $P_{UE-i}$ represents a FH pattern assigned to the ith MS.

Referring to FIGS. 2-4, the system of FIG. 1 operates in the following manner:

Each user (MS) measures pathlosses (10) to the neighboring BSs and transmits (12) this information to its serving BS on a regular basis as show in FIG. 2. The measurement reporting rate in DFH with NARA need not be very high, e.g., the rate used for Mobile Assisted Handoff would be enough.

Each BS communicates to several tiers of its neighbour BSs the information about its own resource utilization: time slots, frequency hopping patterns, and power levels that are currently in use as shown in FIG. 3.

Combining the information received from other BSs regarding to their own resource utilization and the pathloss measurements reported by its MSs, the serving BS calculates the interference level at each available resource, then determines the least-interfered time slot and FH pattern pair, and finally assigns this to the MS as shown in FIG. 4.

In this instance the mobiles are not assigned a pre-defined pattern (such as pseudo random or cyclic hopping patterns). The hopping sequence is generated by the BS dynamically according to the interference level on each frequency at each hop. The BS may communicate the entire hopping sequence or only the incremental changes in the frequencies within the hopping sequence to the MSs.

This procedure applies to new as well as to currently active users; the serving BS continuously monitors each user's performance and reassigns it a new set of resources if the performance degrades below a threshold.

Although DFH improves the performance compared to conventional systems as well as systems using CFH, it requires BS coordination. In conventional wireless communications systems, neighboring BSs do not have a wired link between each other. Therefore, exploiting DFH in the current conventional wireless communications systems encounters the same practicality bottleneck described above.

As is apparent to one skilled in the art, integrating relaying concepts into conventional wireless communications systems increases high data rate coverage as well as capacity in a cost-effective manner. However, due to the bottleneck described above, conventional DFH may reduce the benefit of deploying relays.

In view of the above, there is a need for an improved system and method for resource management in relay networks.

SUMMARY OF THE INVENTION

It is an object of the invention to provide a system and method that obviates or mitigates at least one of the disadvantages of existing systems.

In accordance with an aspect of the present invention, there is provided a method for capacity and coverage enhancement in a wireless network including a plurality of cells, each cell having a base station and a plurality of relay stations, the base station communicating with one or more user equipments in the cell directly or through one or more relay stations in the cell, including the steps of: collecting interference information on possible interference gathered by a user equipment within a cell; determining, base on the interference information collected within the cell, one or more frequency channels or sub-channels on which the interference is most severe; and dynamically generating a frequency hopping (FH) pattern for the user equipment in the cell based on the one or more frequency channels or sub-channels, without any transmission coordination between difference cells.

In accordance with a further aspect of the present invention, there is provided a network system for a wireless network including a cell, the cell having a plurality of relay stations, including: a base station including: a module for collecting pathloss information associated with possible interference gathered by a user equipment in the cell, directly or through one or more relay stations in the cell; a module for determining, based on the pathloss information reported through an uplink, one or more frequency channels or sub-channels on which the interference is significant, and selecting an algorithm; and a module for generating a frequency hopping (FH) pattern for the user equipment in the cell using the selected algorithm, without any transmission coordination between difference cells.

In accordance with a further aspect of the present invention, there is provided a network system for a wireless network including a cell, the cell having a plurality of relay stations, including: a base station including: a module for communicating with one or more user equipments in the cell, directly or through one or more relay stations in the cell; a scheduler for controlling scheduling in its serving cell and determining scheduling information for the relay stations in the cell, the scheduler dividing a time into a plurality of time slot types, and dynamically allocating one or more subunits to each time slot type, the relay stations in the base station domain being synchronized with the base station; a module for changing transmit power based on the time slot type.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF THE PREFERRED EMBODIMENTS

Figure 1:
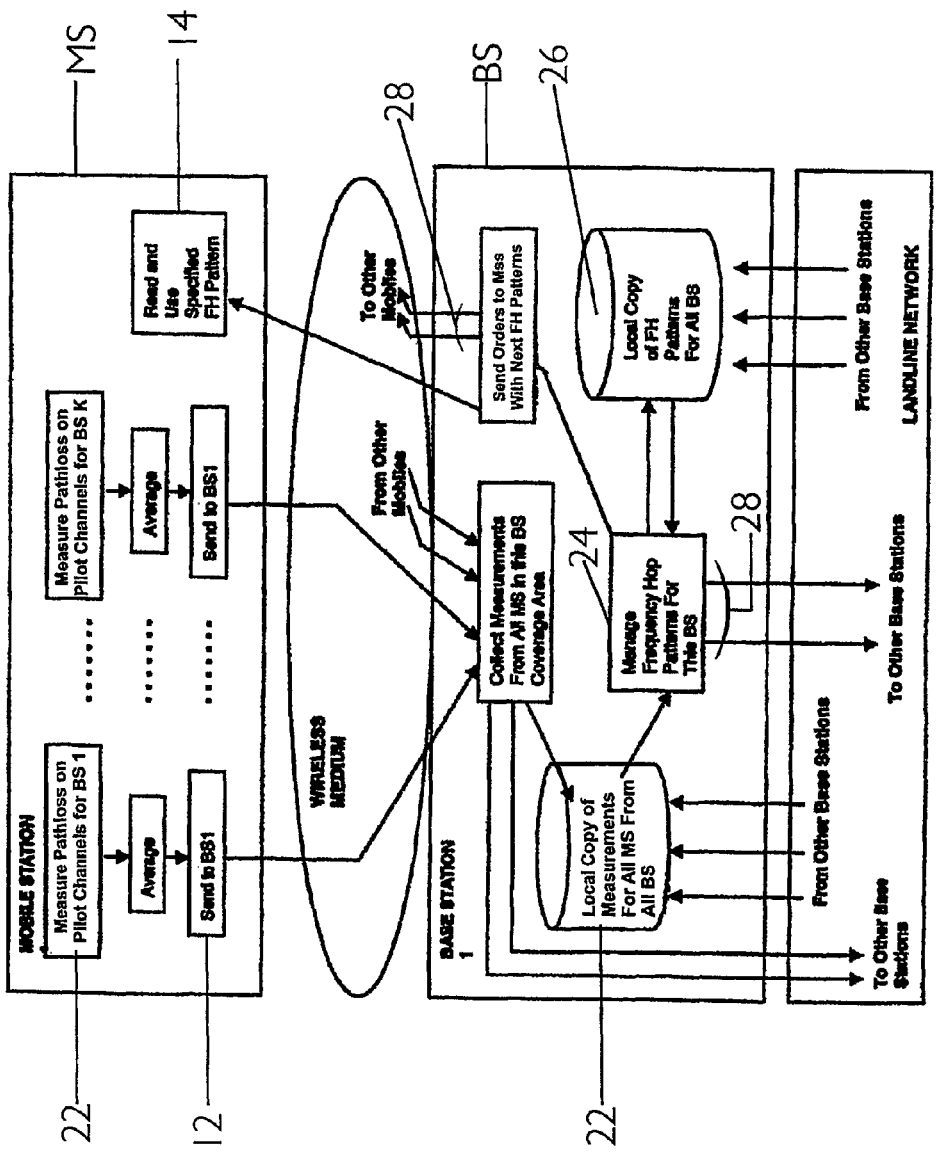
FIG. 1 is a block diagram showing a conventional cellular system where NARA is used for downlink DFH implementation.
Figure 2:
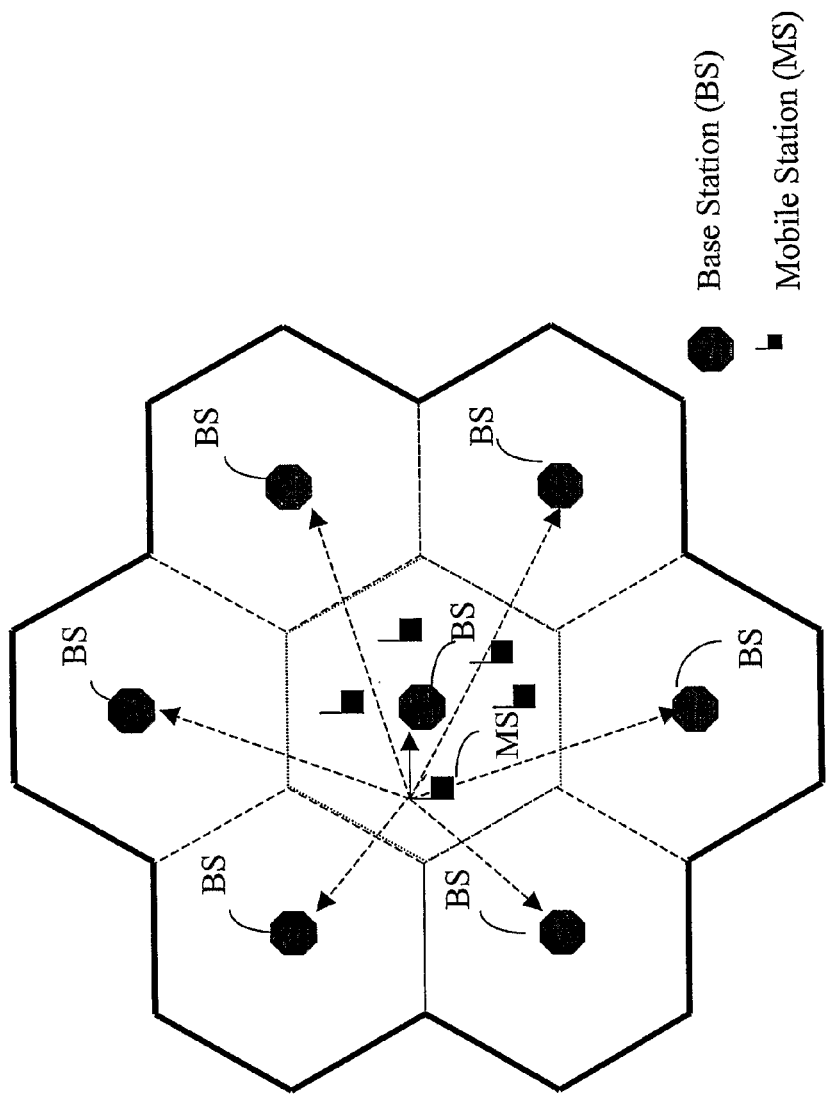
FIG. 2 is a diagram showing an exemplary operation of FIG. 1, where each mobile station continuously measures the quality of all frequencies availability.
Figure 3:
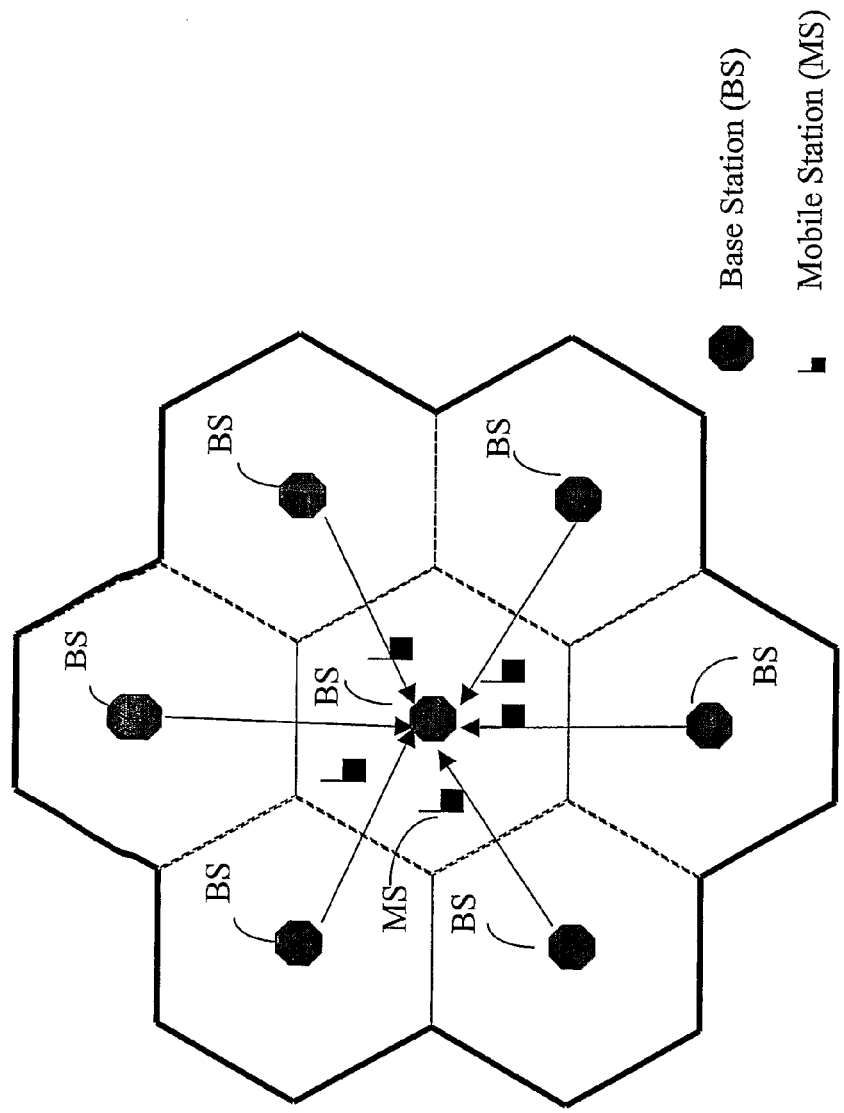
FIG. 3 is a diagram showing an exemplary operation of FIG. 1, where neighboring base stations report to a base station their resource allocation information.
Figure 4:
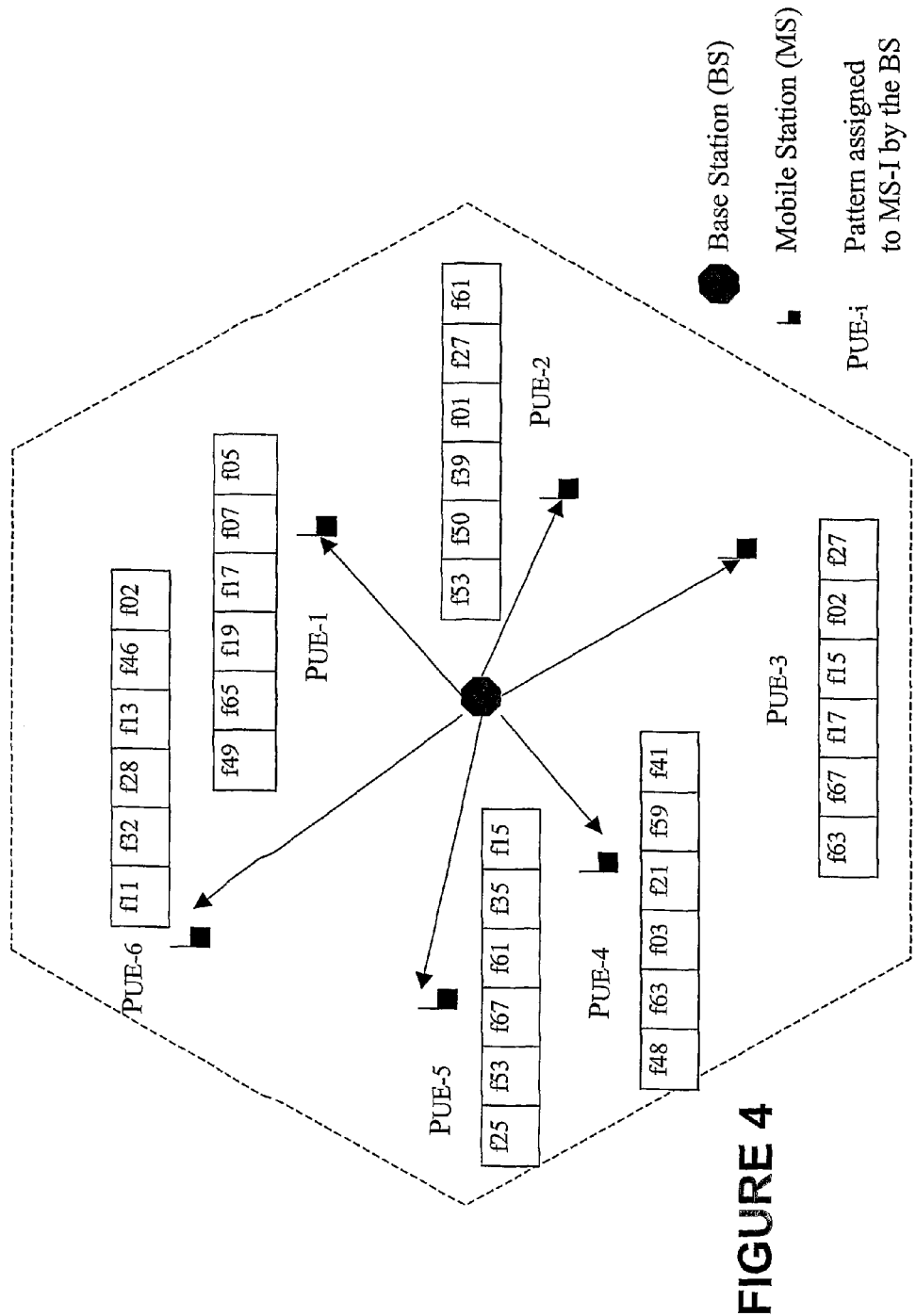
FIG. 4 is a diagram showing an exemplary operation of FIG. 1, where frequency hopping patterns are assigned to the mobile stations based on the measurement of FIG. 3.
Figure 5:
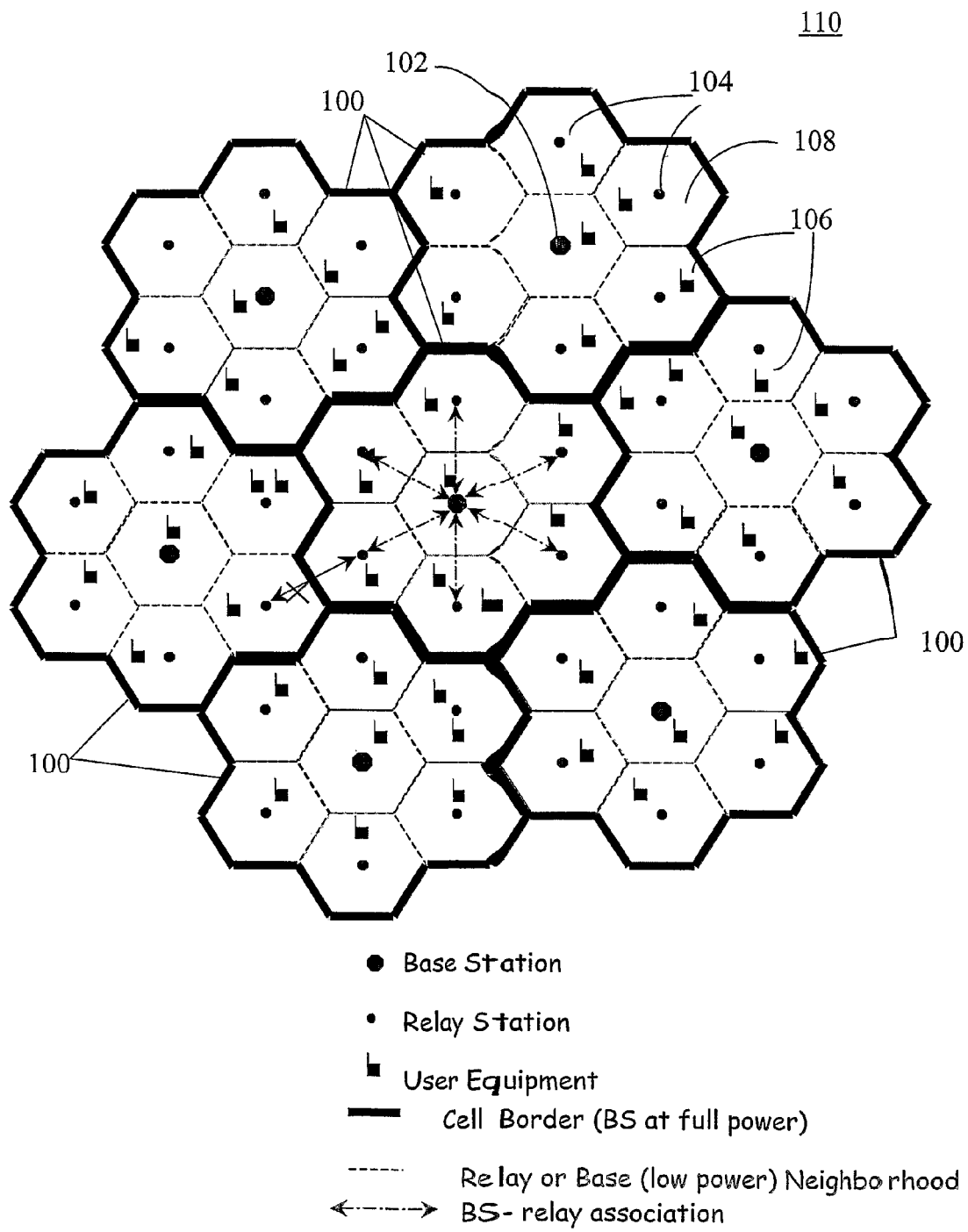
FIG. 5 is a diagram showing a cellular relay network system to which capacity and coverage enhancement mechanism in accordance with an embodiment of the present invention is suitably applied.

FIG. 5 illustrates a cellular relay network system 110 to which coverage enhancement mechanism in accordance with an embodiment of the present invention is suitably applied. The cellular relay network system 110 is a rate controlled wireless network system with selective relays.

The cellular relay network system 110 includes a plurality of cells 100. The cell 100 implements the capacity (maximize aggregate per cell throughput) and coverage (minimize outage probability and increase the data rate availability over the area of the cell) enhancement mechanism which is capable of improving capacity and coverage for both downlink and uplink in the cell.

The capacity and coverage enhancement mechanism includes dynamic resource partitioning for dynamically partitioning resources, and interference avoidance/averaging mechanism for creating frequency hopping patterns (FHs) and allocating frequencies based on interference measurements within the cell.

The interference avoidance/averaging mechanism is facilitated through transmission coordination in a cell without the need for any transmission coordination between different cells. Thus, the cell 100 provides a decentralized processing system which avoids non-timely information exchange among neighboring base stations to implement the interference management/avoidance.

The capacity and coverage enhancement mechanism is applicable to wireless systems which support multimedia services, and may implement TDMA or OFDM(A).

Each cell 100 includes a base station 102 and a plurality of in-cell relay stations. The cell 100 is a two hop cellular system. However, the cell 100 may be multiple hop (more than two hop) cellular system. In the description below, "base station" and "BS" may be used interchangeably. In the description, in-cell relay stations (or relays), intra-cell relay stations (or relays) may be used interchangeably.

The relay stations 104 are fixed relay stations, and are spaced uniformly around the cell. However, the relay stations 104 may not be spaced uniformly around the cell 100. In another embodiment, the relay stations 104 may be movable (dedicated relay, e.g., in buses) or mobile (mobile functioning as relay). In the description below, "relay station", "relay", and "RS" may be used interchangeably.

A plurality of terminal stations 106 may be in the cell 100 (hereinafter referred to as user equipment 106). The user equipments 106 are mobile stations, and can move from one cell to another cell. In the description below, "user equipment" and "UE" may be used interchangeably.

The user equipment 106 is unaware of whether the transmissions are received from the base station 102 or the relay station 104. The selective relaying can be deployed selectively or ubiquitously.

The base stations 102 in difference cells are connected to the Internet either directly or through a set of network elements. The user equipments 106 in different cells communicate with the base station 102 either directly or via relays. This is transparent to the user equipment 106. The user equipments 106 in the different cells communicate with each other via the BS-network-BS connection.

In FIG. 5, seven hexagonal cells are shown as an example. However, the system 110 may include more or less than seven cells. The cell 100 may be surrounded by less than six or more than six other cells. The cell 100 does not need to be hexagonal in shape. It is apparent to a person skilled in the art that the number of cells is changeable.

In FIG. 5, each cell 100 includes one base station 102 and six in-cell relay stations. Thus, there are six links between the base station 102 and its in-cell relay stations 104. However, the cell 100 may include more or less than six relay stations. Each cell 100 may also be sectored into three or more sectors with relay stations 104 distributed amongst the sectors.

Each cell 100 contains a plurality of neighborhoods (sub-cells) 108. In FIG. 5, each cell 100 has six sub-cells which correspond to the in-cell relay station neighborhoods, and a center sub-cell which corresponds to the base station neighborhood and is surrounded by the relay station neighborhoods. The sub-cell is the area of the cell where a relay station 104 provides coverage, and/or the area of the cell where the base station 102 provides coverage when operating at reduced power as described below. It is noted that in the description, the term "sub-cell" and the term "neighborhood" may be used interchangeably. In FIG. 5, a thick line represents the cell border, and a dotted line represents a relay or base neighborhood/sub-cell border. It is apparent to a person skilled in the art that the number of sub-cells is changeable.

The base station 102 and its in-cell relay stations 104 in its serving cell have a master-slave relation. The base station 102 controls the operation of the in-cell relay stations 104 in its serving cell. A scheduler (e.g. 400 of FIG. 10) in the base station 102 manages all control, scheduling and routing in its serving cell 100. It ensures interference avoidance and inference averaging.

The relay stations 104 operate with a spectrum (e.g. a cellular spectrum) assigned by the base station 102. The relay station 104 alternately communicates with the base station 102 and with the user equipment 106. The relay station 104 performs bearer path transmission. The relay station 104 selectively relays data to preferred user equipments. The relay stations 104 appear as another class of terminals to the base station 102.

The assignment of transmission resources to the relay stations 104 within the cell 100 may be made based on minimizing interference generated by the relays operating within the cell (interference avoidance), averaging the interference arising outside the cell 100 or a combination thereof.

The frequency reuse in a neighborhood in the sub-cell 108 is one. Thus, at a specific time, the same frequency can be used up to seven times in the cell, since the cell 100 contains seven sub-cells or neighborhoods in this embodiment.

The hopping patterns assigned to the user equipments 106 within a sub-cell are orthogonal to each other so as to minimize interference in a sub-cell. Preferably there is no adjacent channel interference either. The only existing interference experienced by the user equipment may then be one of inter-cell interference created by the relay stations and/or the base stations of the surrounding sub-cells.

The cell 100 implements dynamic resource partitioning. The resources are divided into a plurality of units and allocated to the BS-UE/relay transmissions, to BS-UE transmissions, and to relay-UE transmissions as described below. In this embodiment, the dynamic resource partitioning is controlled by the base station 102 (e.g. scheduler 400 of FIG. 10).

The base station 102 and the in-cell relay stations 104 may communicate using some efficient strategy, such as directional antennas or adaptive antennas, so as to optimize the resource usage of this link. Thus, the base station 102 of FIG. 5 contains six directional antennas (not shown). In FIG. 5, broken lines with arrows represent relay-base communications, e.g., through the directional antennas. The base station 102 and the relay stations 104 may use omni-directional or sector or other antenna arrangements to communicate with the user equipments 106 in the cell. The user equipments 106 may also use omni-directional antennas for communicating with the base station 102 and the relay stations 104.

The relay stations 104 are preferably deployed into the cell such that the relay stations 104 in a cell can support a good link with the base station 102 in that cell. For example, the relay stations 104 are located by way of line-of-sight locations.

Figure 6:
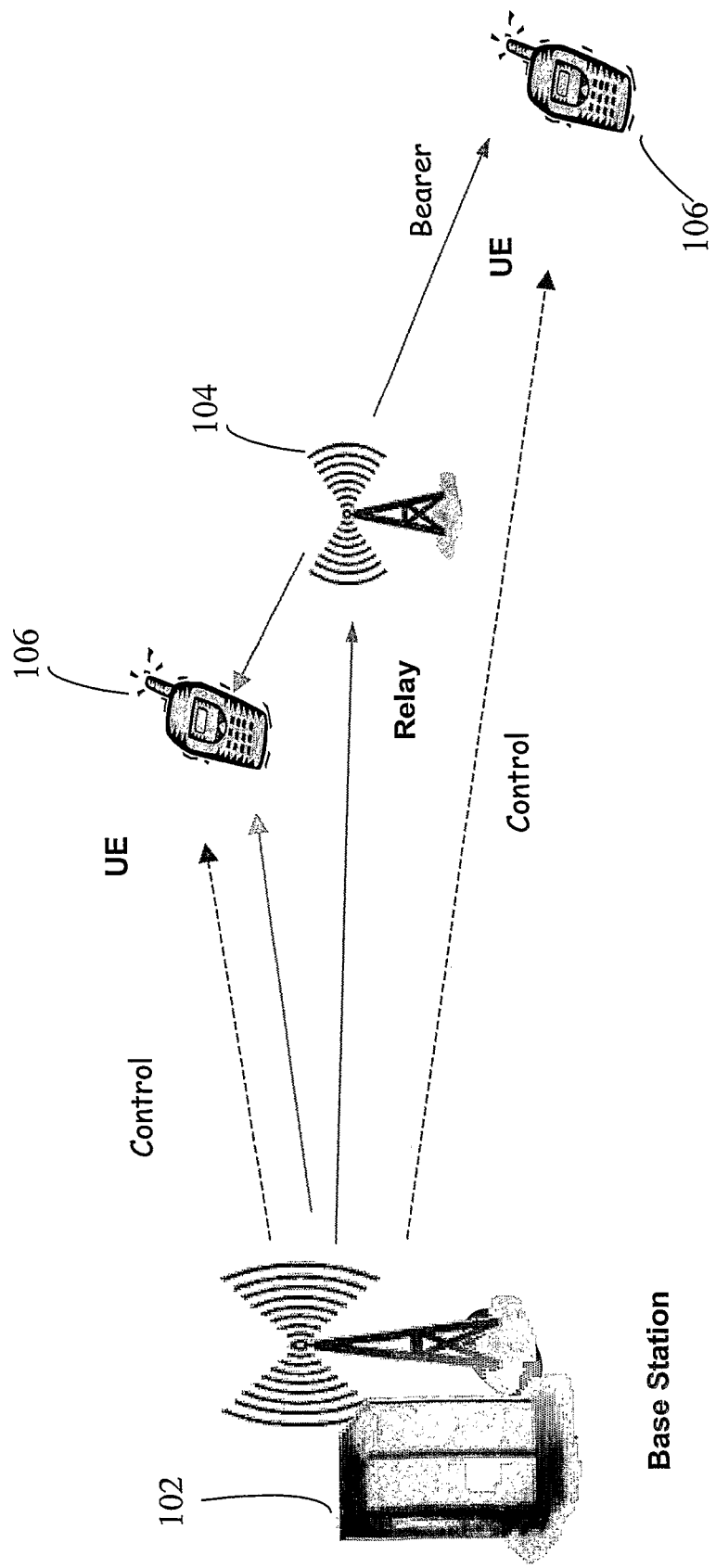
FIG. 6 is a diagram showing exemplary communication paths for downlink in a cell of FIG. 5.
Figure 7:
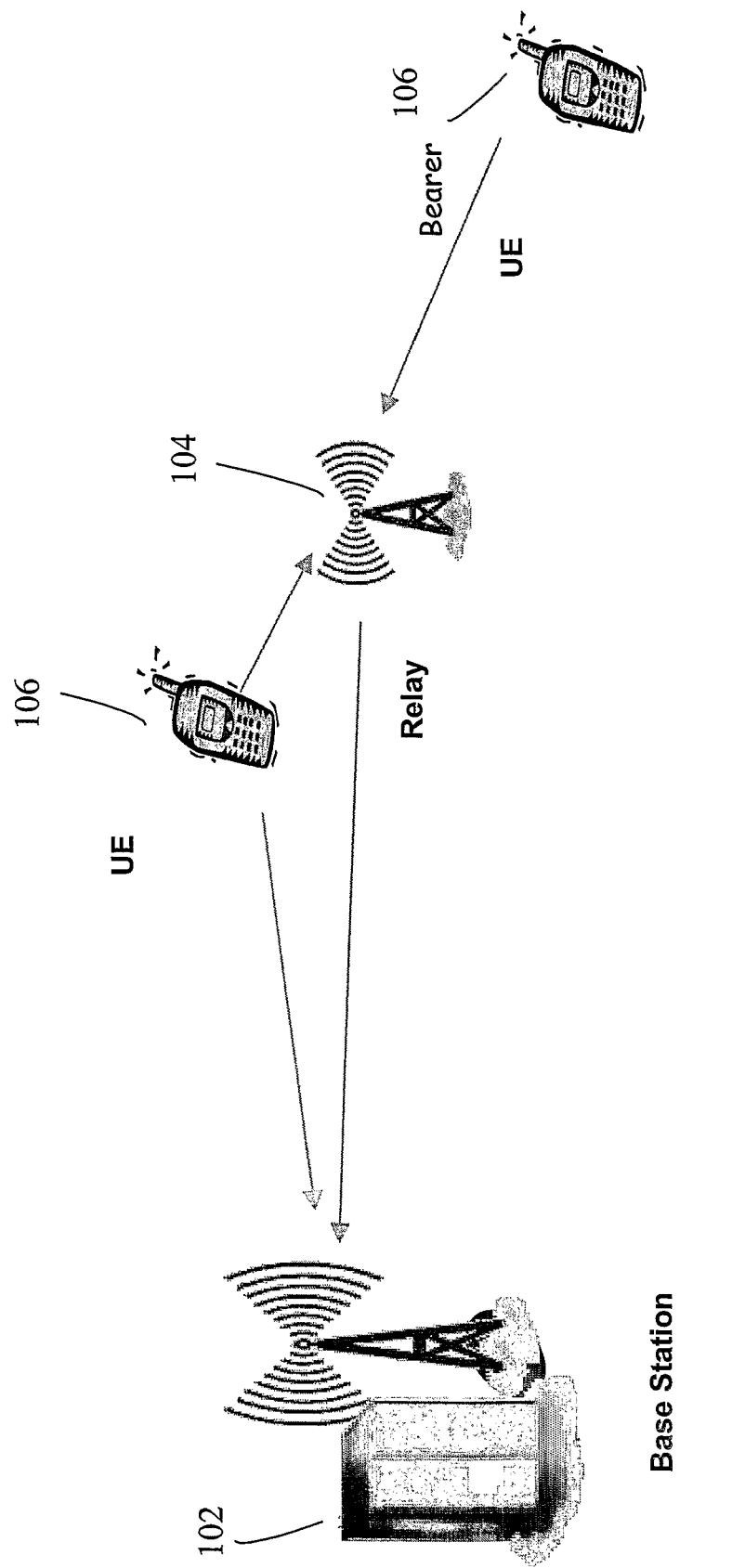
FIG. 7 is a diagram showing exemplary communication paths for uplink in a cell of FIG. 5.

FIG. 6 illustrates exemplary communication paths for downlink in the cell 100 of FIG. 5. FIG. 7 illustrates exemplary communication paths for uplink in the cell 100 of FIG. 5. A cellular phone is shown as the user equipment 106. However, it is apparent to a person skilled in the art that the user equipment 106 is not limited to the cellular phone. The user equipments 106 may be any portable computer devices, personal communicators, personal digital assistants, or other wireless devices.

Referring to FIGS. 5-7, the base station 102 receives data from the in-cell relay stations 104 in its neighborhood (uplink) or the user equipments 106 in its neighborhood (uplink). The base station 102 transmits, to the relay stations 104, data which is directed to the user equipments 106 in the relay station neighborhood (downlink) or directly transmits data to the user equipments 106 in its neighborhood (downlink). The data transmitted from the base station 102 may include FH pattern(s). The base station 102 also transmits control and signaling messages directly to all of the user equipments in its serving cell 100 (downlink).

The relay station 104 serves one or more than one user equipment in its coverage region. The active user equipments 106 in the coverage area of the relay station 104 communicate all their data through that relay station 104 (downlink/uplink). The relay station 104 collects data from the user equipment 106 and transmits it to the serving base station 102 (uplink) and also transmits data from the serving base station 102 to the active user equipments 106 (downlink). The relay station 104 implements receiving or transmitting at a time, thus does not receive and transmit any data at the same time. The data transmitted from the relay station 104 to the user equipment 106 may include FH pattern(s).

Downlink and uplink communication may occur on different frequency carriers (FDD) or in sets of time slots for each (TDD).

It is noted that a relay station in a cell does not communicate with another relay station in a different cell as shown in FIG. 5. The in-cell relay stations may communicate with each other. Relay to relay communication is also under the direction of the base station 102 in its cell, and the concepts presented here for a communication from the relay station 104 to the user equipment 106 may be extended to a communication between the relay stations 104 as well.

The dynamic resource partitioning is described in detail. The cell 100 implements dynamic resource partitioning by employing a Time Division Multiplexed (TDM) scheme. The base station 102 determines the scheduling information for the relay station 104. The relay stations 104 within the base station domain (i.e. the coverage region of a base station) are synchronized with that base station 102.

Figure 8:
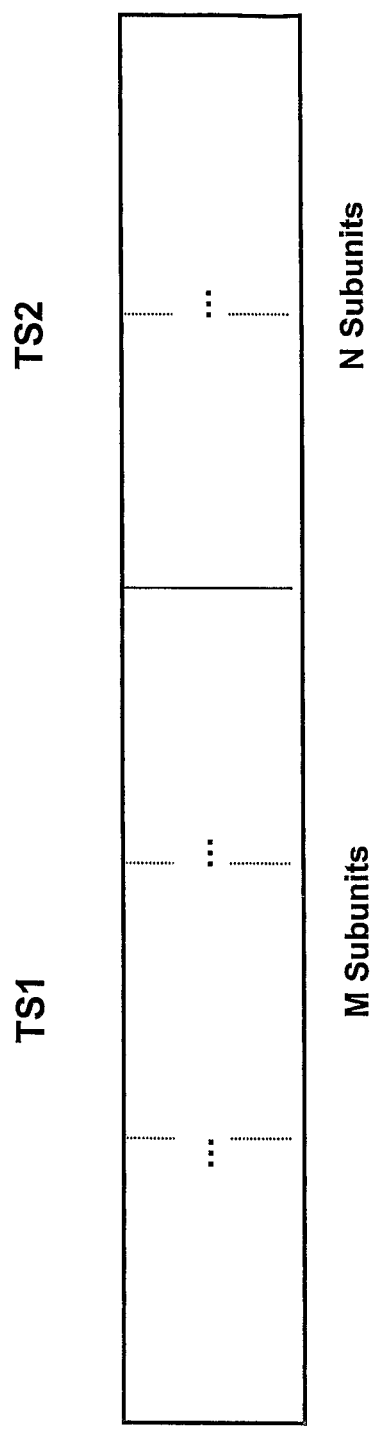
FIG. 8 is a diagram showing an example of dynamic resource partitioning scheme in FIG. 5.

For the downlink, the time is divided into a plurality of time slot types including a first type of time slot TS1 and a second type of time slot TS2. In the description, "Time slot type 1", "Time slot 1", "the first type of time slot", "TS1" may be used interchangeably. In the description, "Time slot type 2", "Time slot 2", "the second type of time slot", "TS2" may be used interchangeably. FIG. 8 illustrates an example of the dynamic resource partitioning scheme. In FIG. 8, TS1 includes M subunits, and TS2 includes N subunits (M, N≧1). Each TS1 may have the different number of subunits. Each TS2 may have the different number of subunits. The number of the subunits in each TS1 and TS2 is changeable. The size of each TS1 and TS2 may be determined by the scheduler (e.g. 400 of FIG. 10) of the base station (102 of FIG. 5), for example, by taking into account of RS-UE link, BS-UE link and BS-UE/RS link conditions. TS1 may include different number of time subunits versus TS2.

For the downlink, TS1 is allocated to BS-UE/RS link including BS-RS (base station-relay station) communication and BS-UE (base station-user equipment) communication for control signaling. For the downlink, TS2 is allocated to BS-UE communication and RS-UE (relay station-user equipment) communication.

The time slots TS1 and TS2 are the division of slots for the downlink in an FDD system of the cell 100. Similar division may be applied on the uplink.

In one embodiment, TS1 and TS2 are also allocated on the uplink communication. For example, TS1 is allocated to RS-BS communication and UE-BS communication for control messaging, and TS2 is allocated to UE-BS communication, and UE-RS communication.

The base station 102 has two modes for transmit power, namely high power mode and low power mode. In TS1, the base station 102 operates at the high-power mode. At the high power mode, the transmit power of the base stations 102 covers the range of its corresponding cell 100. The transmit power of the relay station 104 is lower than the transmit power of the base station 102 in the high power mode. In TS2, the base station 102 operates at the low power mode. At the low power mode, the transmit power of the base station 102 equals the transmit power of the in-cell relay station 104, and the combination of the base station transmit power and relays cover the range of the same cell.

The relay station 104 has two operation modes, namely, transmitting mode and receiving mode. In TS1, the relay station 104 only implements receiving (receiving mode). In TS2, the relay station 104 only implements transmitting (transmitting mode). The relay stations 104 do not receive and transmit data at the same time slot.

The duration of TS1 depends on the function for the high power mode. The duration of TS2 also depends on the function for the low power mode. TS1 may have duration different from that of TS2, since different functions are activated in the two slots. With optimized links between the relay station and the base station, the duration of TS1 may be a fraction of the duration of TS2.

Figure 9:
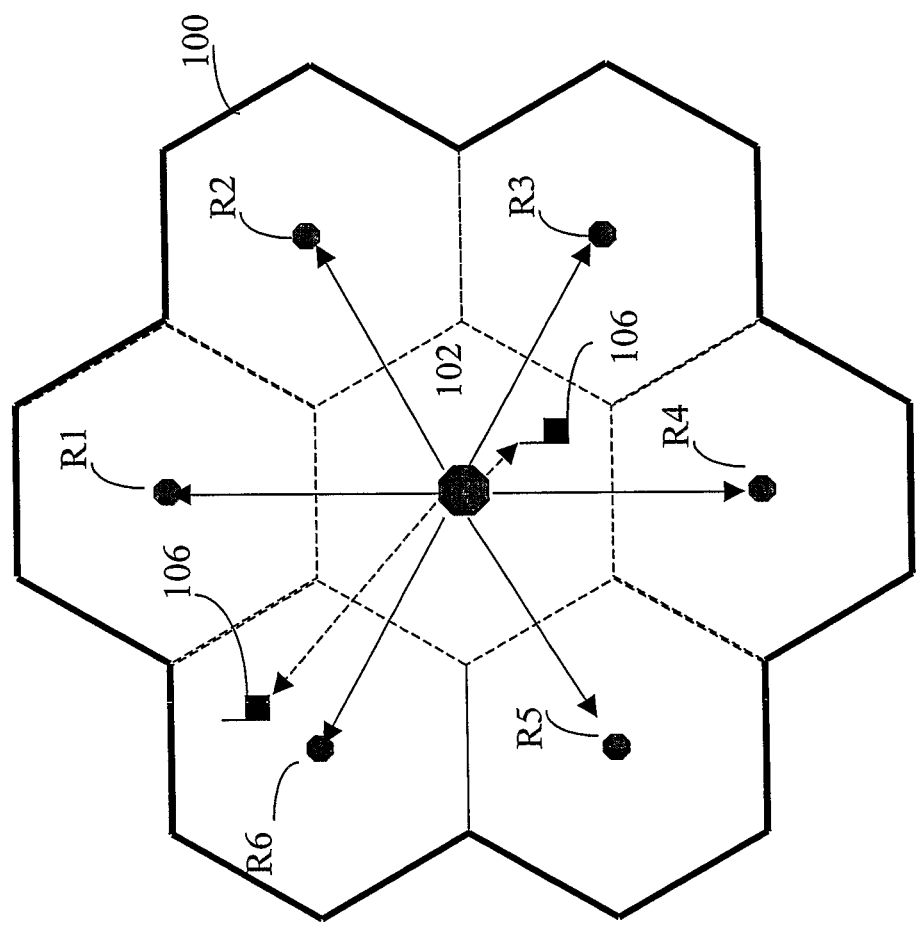
FIG. 9 is a diagram showing a summary of functions activated in a first time slot.

The time slot 1 (TS1) is now described in detail. FIG. 9 shows a summary of the functions active in TS1 for the downlink. In FIG. 9, RS1-RS6 represent in-cell relay stations (104 of FIG. 5). In TS1, the base station 102 transmits with high power. The base station 102 sends, to the in-cell relay station(s) 104 in its serving cell 100, data of the user equipments 106 in the relay station neighborhood(s). The data of the user equipments 106 are sent to all of the relay stations RS1-RS6 when the data is to be sent to all of them. The data of the user equipments 106 are sent to the subset of the relay stations RS1-RS6 sequentially when the data is to be sent to the subset. The data may includes FH patterns.

In TS1, the base station 102 transmits the control and signaling messages directly to all of the user equipments 106 in its serving cell 100 to keep track of the user equipments all over the cell 100. The base station 102 operates in the high power mode to reach the user equipments 106 at the periphery of the cell 100.

The control and signaling message signals sent by the base station 102 do not interfere with the data communication signals above, since the channels used for data communication and control/signaling functions are orthogonal to each other.

The base station 102 does not send, to the relay station, data/FH pattern which is directed to the user equipment in the base station neighborhood. The base station 102 does not transmit any other data to the user equipments 106 throughout the whole cell 100.

In TS1, the relay stations 104 only receive from the base stations 102. The FH patterns and the data received by the relay stations will be passed to the user equipments in their covering regions in TS2.

On the uplink, TS1 is used for RS-BS transmission, as well as for the control messaging from the user equipments, such as for transmission of pathloss information for every carrier or subcarrier frequency, or for transmission of changes to the pathloss only for those frequencies in which it has actually changed.

The time slot 2 (TS2) is now described in detail. In TS2, the base station 102 transmits with low power, which is substantially equal to the transmit power of the relay station 104 and is a parameter. Therefore, there exists no dominant power source throughout the whole system.

During TS2, there are two possible communications for the downlink, namely including BS-UE communication, and RS-UE communication. Similarly, for the uplink, there are two possible communications, namely including UE-BS communication, and UE-RS communication, on the uplink FDD carrier.

On the downlink, the base station 102 only transmits data to the user equipments 106 which are in its coverage region only (BS-UE communication), instead of the whole cell. The base station coverage region ideally overlaps with its neighborhood.

On the downlink, the relay station 104 only transmits data to the user equipments 106 in its coverage region (RS-UE communication). The relay station coverage region ideally overlaps with its sub-cell. The size of the base station coverage region is substantially same as that of the relay station coverage region. The relay stations 104 do not receive any data from the base station 102.

A FH pattern for the user equipment 106 may be transmitted by either the base station 102 or the relay station 104.

The interference avoidance/averaging mechanism is now described in detail. In order to utilize the resources in TS2 and to keep the interference level low, the cell 100 employs Intra-cell Dynamic Frequency Hopping (I-DFH). I-DFH uses the basic principles of DFH to optimize the resources in TS2. I-DFH combines the advantages of both dynamic resource allocation (intra-cell interference avoidance), and of frequency hopping (inter-cell interference averaging). The intra-cell interference may be managed by interference avoidance technique (e.g. DFH), while the inter-cell interference may be dealt with using interference averaging technique (e.g. an orthogonal FH solution). The orthogonal FH solution may include CFH. However, the interference averaging technique is not limited to CFH.

I-DFH creates FH patterns for active users on the fly, according to some measurements and calculations performed in real-time. There is no pre-defined FH pattern, such as pseudo-random patterns, cyclic patterns, etc. The user equipment 106 utilizes the FH pattern provided by the base station 102. The incremental changes in the hopping patterns (rather than the full hopping patterns) are communicated to the relay stations 104.

To measure interference, the base station 102 or the base station 102 and the relay station 104 transmit pilot signals to the user equipments 106. In the description, "pilot signal(s)" and "pilot(s)" may be interchangeably.

Figure 10:
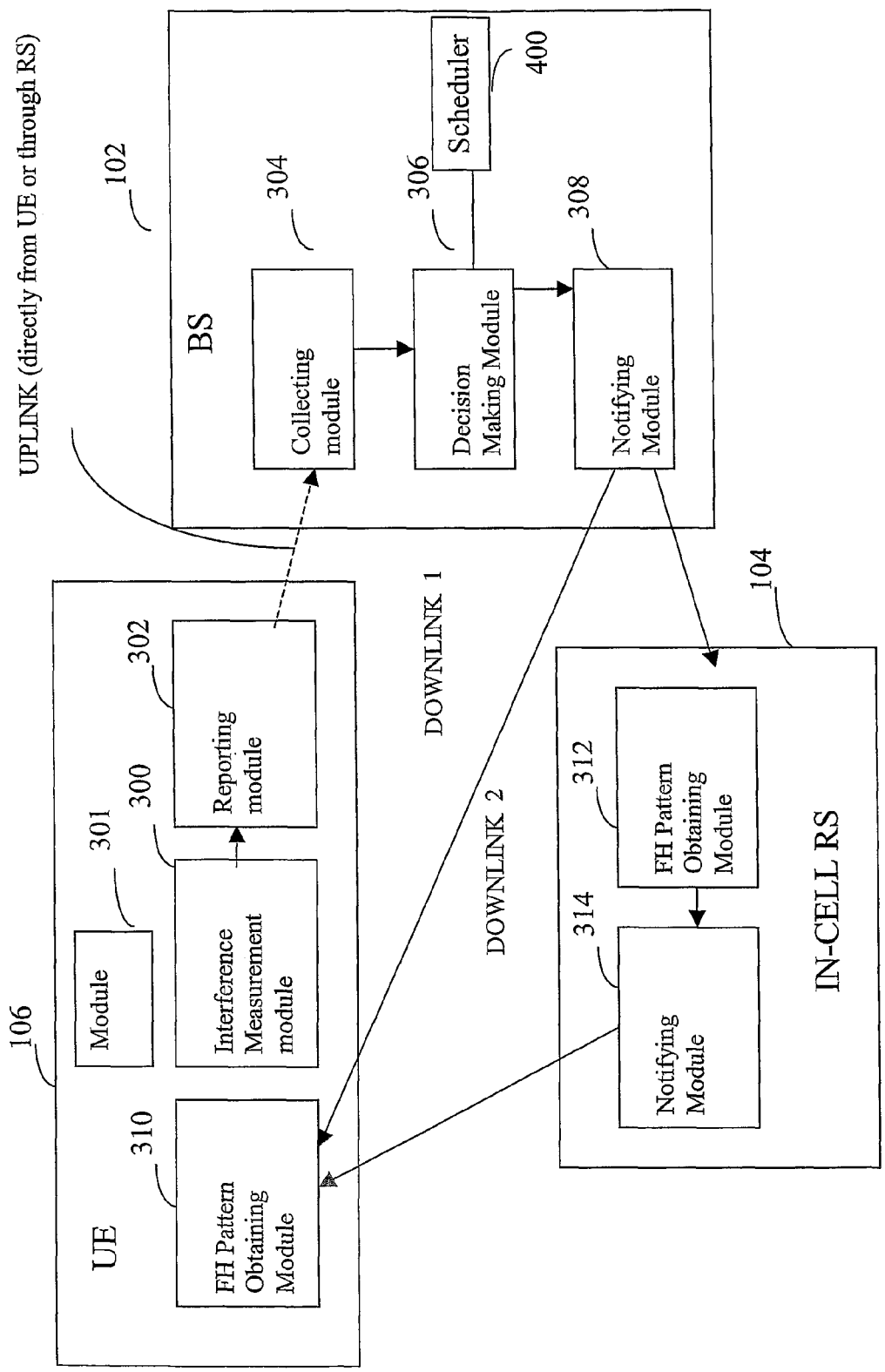
FIG. 10 is a diagram showing an exemplary system for implementing I-DFH on the downlink.

FIG. 10 is a diagram showing an exemplary system for implementing I-DFH on the downlink. The user equipment 106 includes a measurement module 300 (e.g. 220, 222 of FIGS. 13, 250, 252 of FIG. 17) for measuring the signal strength of one or more pilots, which is an estimate of path-loss, and a reporting module 302 for reporting the significant set of pilots measured, which includes each measured signal strength, directly to the base station 102 or through the relay station 104. The measurement module 300 makes measurements of all the significant detectable pilots from relays within the cell. The user equipment 106 includes a module 301 which is capable of determining if the measured pilots are from in-cell relays/base station by referencing the information provided by the base station 102 (the identity of the relays within the cell) when the user equipment 106 enters the cell.

Figure 17:
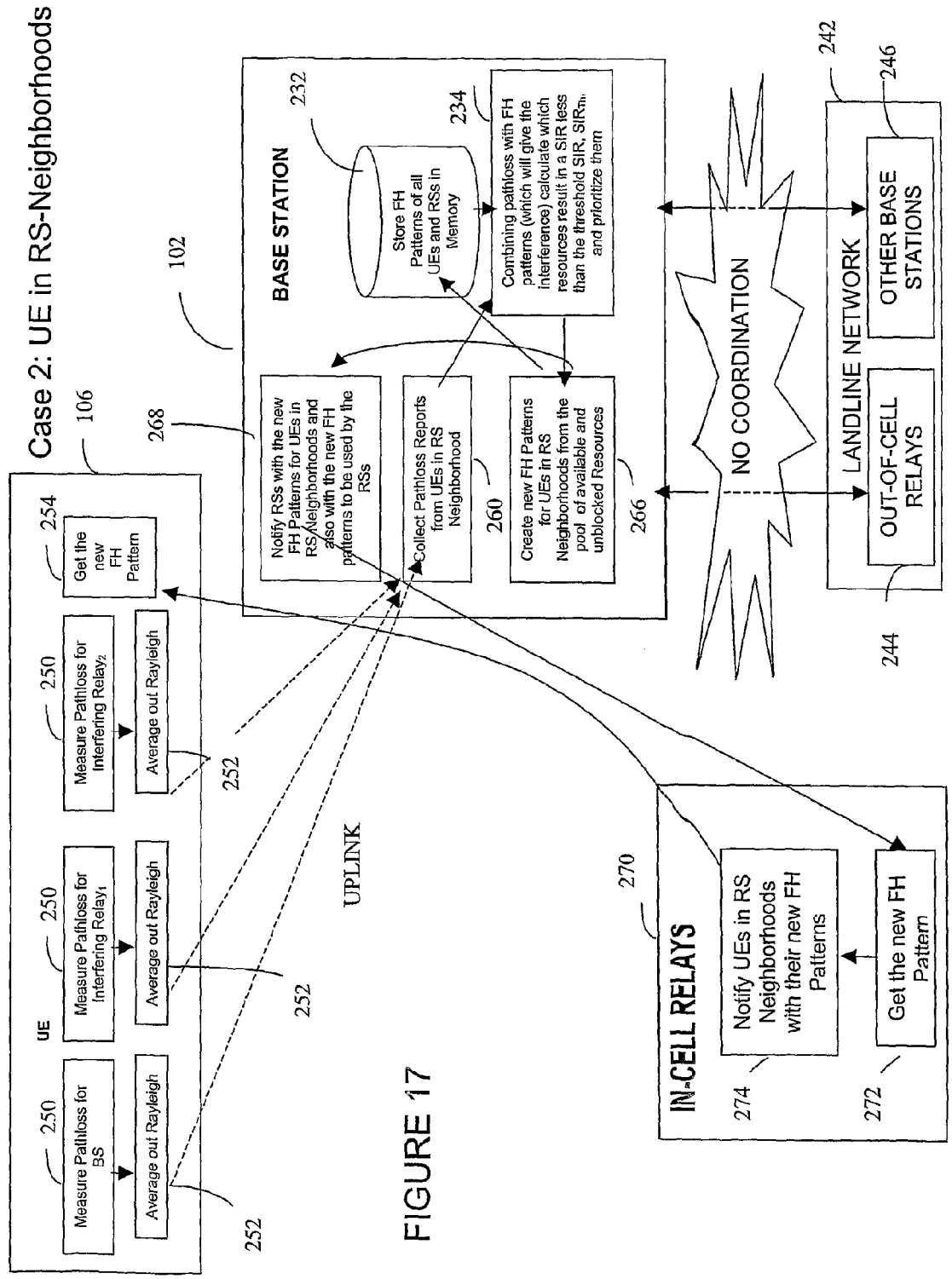
FIG. 17 is a diagram showing an exemplary operation for implementing I-DFH under the scenario of FIG. 15.

The base station 102 includes a collecting module 304 (e.g. 230 of FIG. 13, 260 of FIG. 17) and a decision making module 306 (e.g. 232, 234, 236 of FIGS. 13, 262, 264, 266 of FIG. 17). The collecting module 304 collects the reports from the user equipments in the cell. The decision making module 306 then determines one or more frequency channels or sub-channels on which the interference is significant, and applies the interference avoidance algorithm to the reported interferes (significant pilots) from inside the cell in conjunction with the interference averaging to average the interference from outside the cell. Based on the available interference information, a new FH pattern is created by the decision making module 306 or a module communicating with the decision making module 306. The scheduler 400 takes into account decisions from the decision making module 306 when assigning the downlink transmissions.

The notifying module 308 of the base station 102 notifies the active user (downlink 1) or the relay station 104 (downlink 2) of the new FH pattern, which may be entire hopping sequence or incremental changes in the frequencies within the hopping sequence. The routing mechanism of the base station 102 selects the downlink 1 or downlink 2. In the case of the downlink 2, the relay station 102 uses a module 314 for informing the module 310 of the new FH pattern obtained by the module 312.

It is noted that in this description, "module" and "entity" may be used interchangeably.

The interference to a user equipment comes from the surrounding RSs and/or BS. Depending on the location of the user equipment, some of these interferes may be out-of-cell interferes RSs and/or BS in other cells.

In this embodiment, I-DFH takes account of the first tier interferes. When all first tier interferes are within the base station domain (FIG. 11), the base station 102 can obtain the significant interference information from the relays within its domain, and thus employs interference avoidance technique (DFH). When there are intra-cell interference and inter-cell interference (e.g. FIGS. 14-16), interference avoidance technique addresses the intra-cell interference while the inter-cell interference is mitigated through interference averaging technique (such as CFH) without BS-BS communication. When all the reported interferes are from outside the cell, a conventional FH hopping algorithm may be employed by the decision making module 306.

I-DFH for BS-UE communication in TS2 is described in detail. In this case, all interferes are within the base station domain, and the intra-cell relays are identified as interferers.

Figure 11:
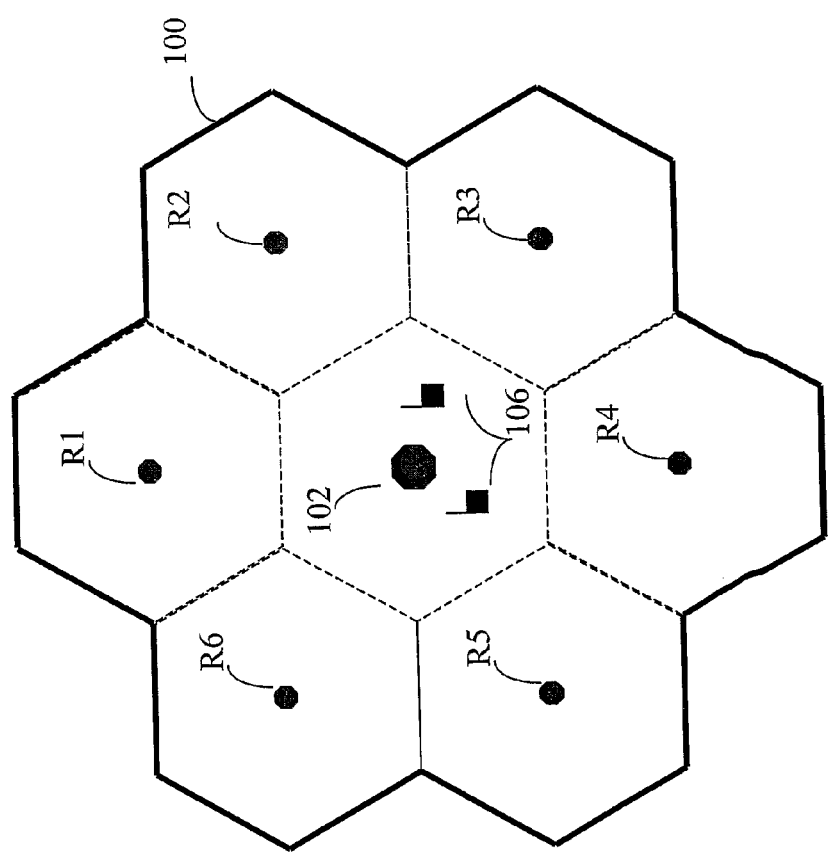
FIG. 11 is a diagram showing an exemplary scenario for BS-UE communication in a second time slot.
Figure 12:
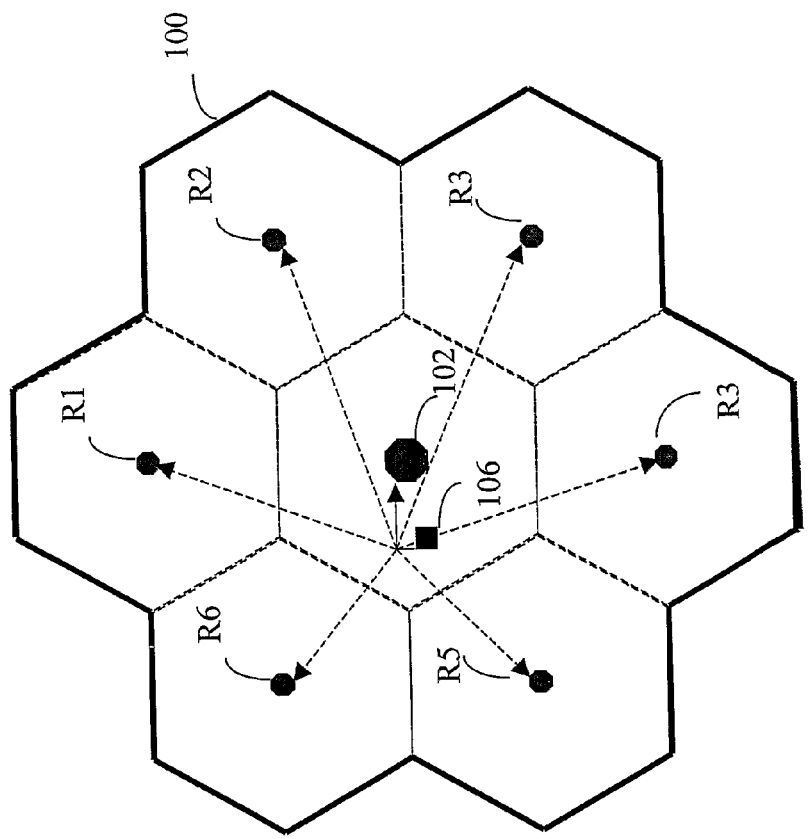
FIG. 12 is a diagram showing pathloss measurements when the UE is in the BS's coverage region.

FIG. 11 illustrates an exemplary scenario for BS-UE communication in TS2 where the user equipment 106 is in the coverage region of the base station 102. FIG. 12 shows pathloss measurements to the in-cell relay stations in the scenario of FIG. 11. In FIGS. 11-12, RS1-RS6 represents in-cell relay stations in the cell 100 (104 of FIG. 5). Referring to FIGS. 11-12, the base station 102 has only its own relay stations as interferers. The user equipment 106 potentially sees most of its first-tier interferers as relays within the same base station neighborhood. In the embodiment, "pathloss measurement (s)" is an estimate of pathloss, and is implemented by measuring the signal strength of a pilot.

This is one example of possible scenarios and a special case where all the dominant interferers are within the set of relays within the cell. Therefore, interference avoidance is more effective since all the dominant interferers are known to the base station 102.

Information utilized by the base station 102 for I-DFH is the interference at the user equipment 106 in a certain time slot with a certain FH pattern. The potential interferers are the relay stations RS1-RS6 surrounding the base station 102. In order for the base station 102 to calculate the interference caused by these six relay stations RS1-RS6 at the user equipment 106, the base station 102 uses information on (i) Transmit power of the relay stations, (ii) Resource utilization information of the relay stations, (iii) Pathloss of the relay stations RS1-RS6 to the user equipment 106.

Since in TS1, the base station 102 has assigned the resources to the relay stations RS1-RS6, and since the relay stations RS1-RS6 have a constant transmission power, the base station 102 already has the information (i) and (ii). The base station 102 obtains information (iii) either directly from each of the user equipments 106 or through the relay stations.

For example the serving base station 102 may implement this assignment according to a performance criterion, such as the SINR (Signal to Interference Noise Ratio) value, raw interference, etc. A prioritized set of frequencies is prepared on the basis of the information obtained from measurements by the user equipments 106. During FH pattern updates, the defective frequencies with SINR levels below a SINR threshold (SINRth) are replaced with the frequencies supporting SINR levels above the threshold SINRth. Frequencies below the threshold SINRth may be selectively employed only when required (e.g., high load).

Figure 13:
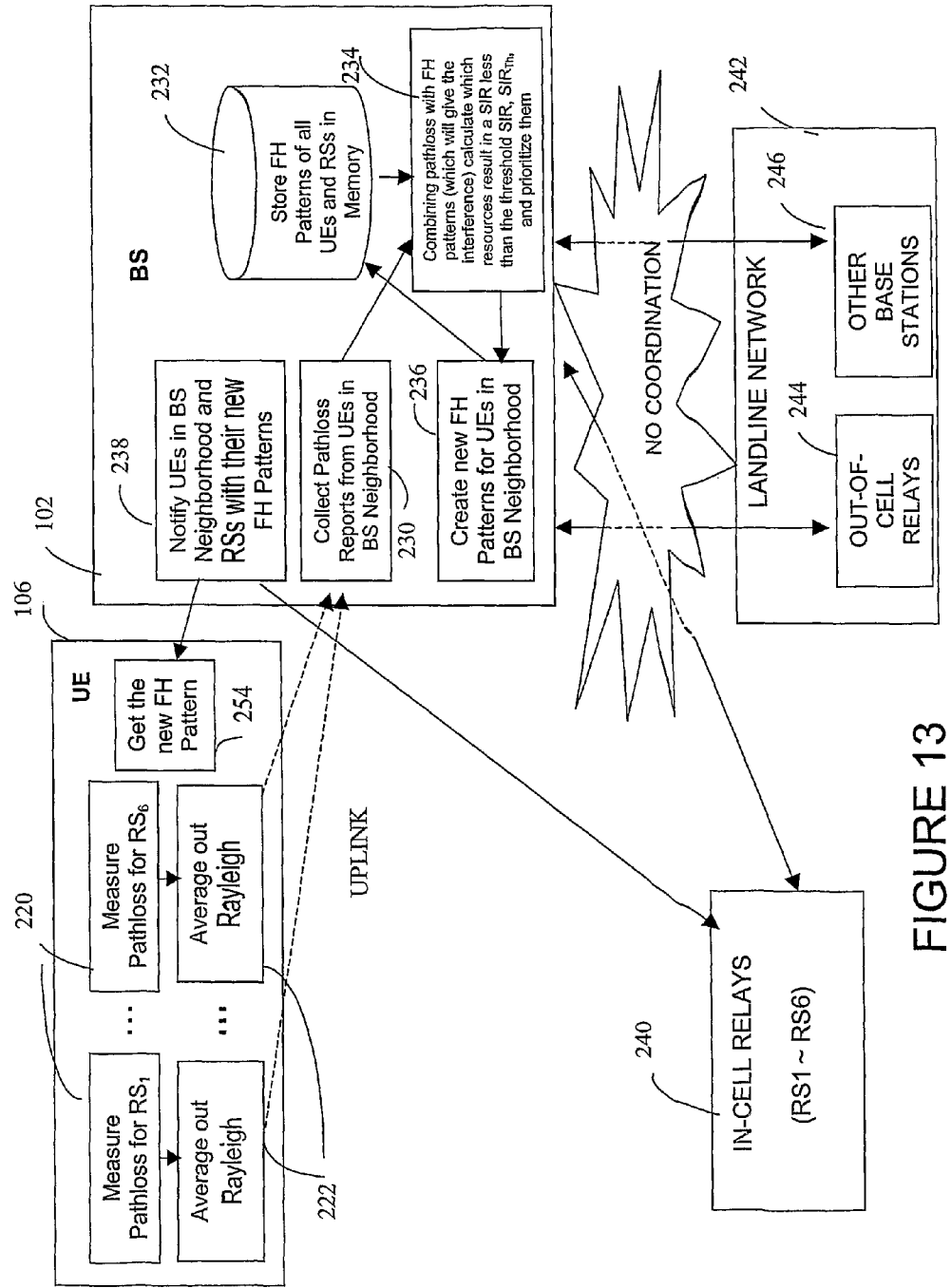
FIG. 13 is a diagram showing an exemplary operation for implementing I-DFH under the scenario of FIG. 11.

FIG. 13 shows an exemplary operation for implementing I-DFH under the scenario of FIG. 11. In FIG. 13, "240" represents in-cell relays (104 of FIG. 5) which has RS1-RS6, "242" represents landline network, "244" represents other relay stations outside the cell 100 (i.e. out-of-cell relay stations), and "246" represents other base stations.

The base station 102 has no coordination with the out-of-cell relay stations 244 and out-of-cell base stations 246 for I-DFH.

Measurement modules 220 in the user equipment 106 implement pathloss measurements (i.e. measuring the signal strength of one or more pilots). The modules 220 make measurements of all the significant detectable pilots. In this case, pathloss of each of the six relay stations RS1-RS6 in the cell will be measured. Averaging modules 222 in the user equipment 106 average out Rayleigh fading based on the outputs from the modules 220 and transmit the pathloss reports to uplink. The pathloss report may include the measured signal strength of the pilot and the identification of the pilot (e.g. identity of in-cell relay associated with the pilot).

A collection module 230 in the base station 102 collects the pathloss reports from the user equipments 106. In this case, the reports are collected from the user equipments in its neighborhood (i.e., the corresponding center sub-cell). A database 232 in the base station 102 records and manages FH patterns information of all of the user equipments 106 and the relay stations 240 in its cell.

Based on the reported measurements from the user equipments, a module 234 in the base station 102 sets an SINR threshold SINRth, and prioritizes those frequencies above the threshold SINRth. A soft limit is placed on the use of frequencies below the threshold, with these frequencies being ordered from highest to lowest SINR. Depending on buffer overloading, delay constraints, etc, these frequencies may be selected in the order of their priority.

Based on the analysis in the module 234, a creation module 236 calculates the interference level at each available resource, and determines the least interfered FH pattern. The module 236 assigns the least interfered FH pattern to the user equipment 106 as a new FH pattern. The least interfered time slot and FH pattern pair are recorded in the database 232. A notification module 238 in the base station 102 notifies the user equipment 106 in the BS neighborhood and the relay stations R1-R6 in the in-cell relays 240 with the new FH pattern.

After the FH pattern assignment, the base station 102 continuously monitors the performance of each user equipment 106 and reassigns another resource if the performance (e.g. SINR) degrades below the threshold SINR.

Where the base station 102 has, as interferers, other relay stations or base stations (second tier members) which are not within its cell, the procedure to be followed for the first hop transmission will be similar to that described below for second hop transmission.

I-DFH for RS-UE communication is described in detail. In this case, the base stations and the intra- and inter-relay stations are identified as interferers.

Figure 14:
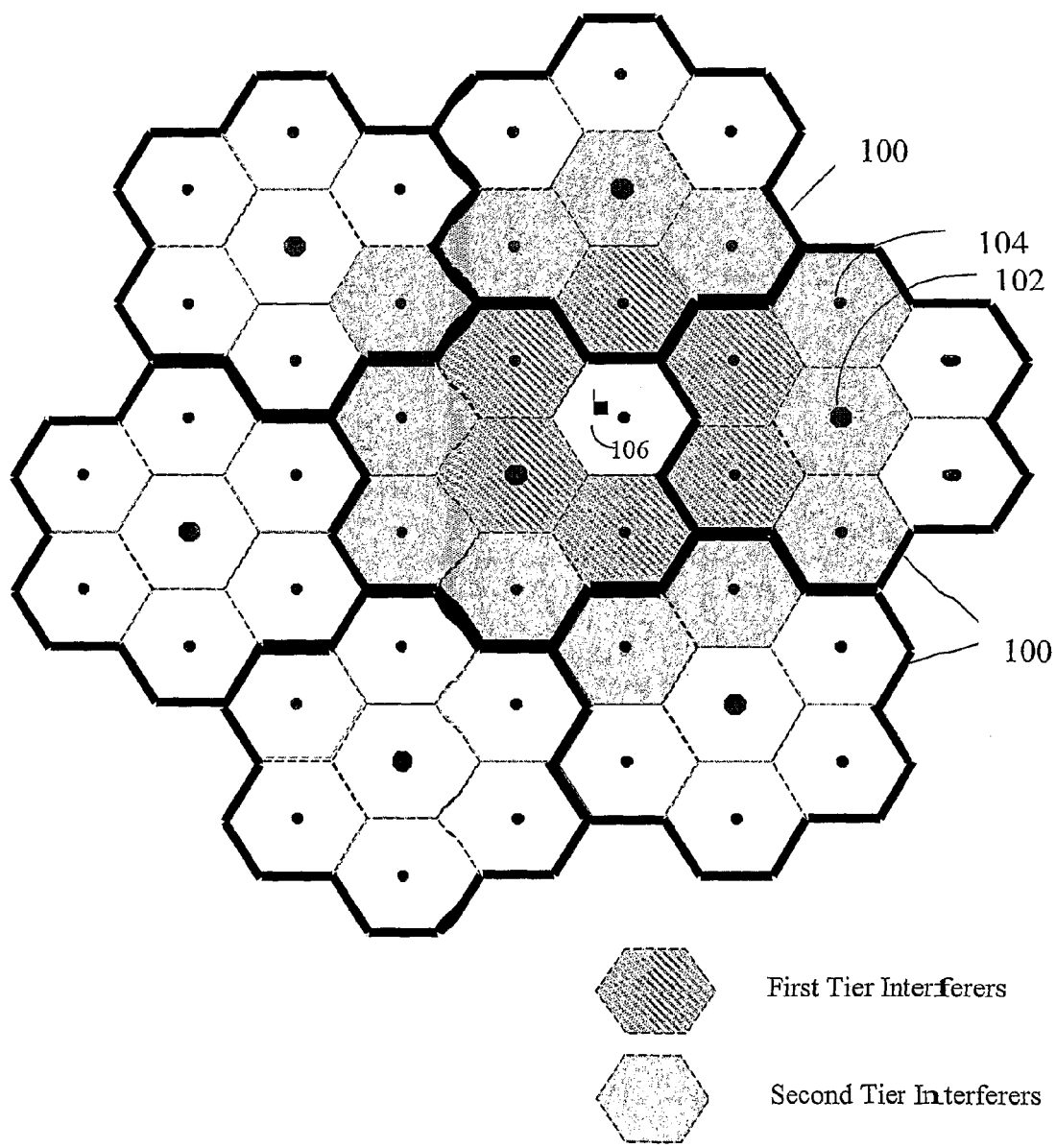
FIG. 14 is a diagram showing first tier and second tier interferers for a relay in the system of FIG. 5.

FIG. 14 shows the first tier and second tier interferers for the relay in the system of FIG. 5 when the user equipment 106 is in the coverage region of the relay station 104. The interference to a user equipment 106 in a certain neighborhood will come from the surrounding relay stations 104 and/or base station 102 of the cell 100. Some of the interferers are out-of-cell interferers (relay stations and/or base stations of other cells). In FIG. 14, the user equipment 106 potentially sees more interference from out-of-cell interferes.

Figure 15:
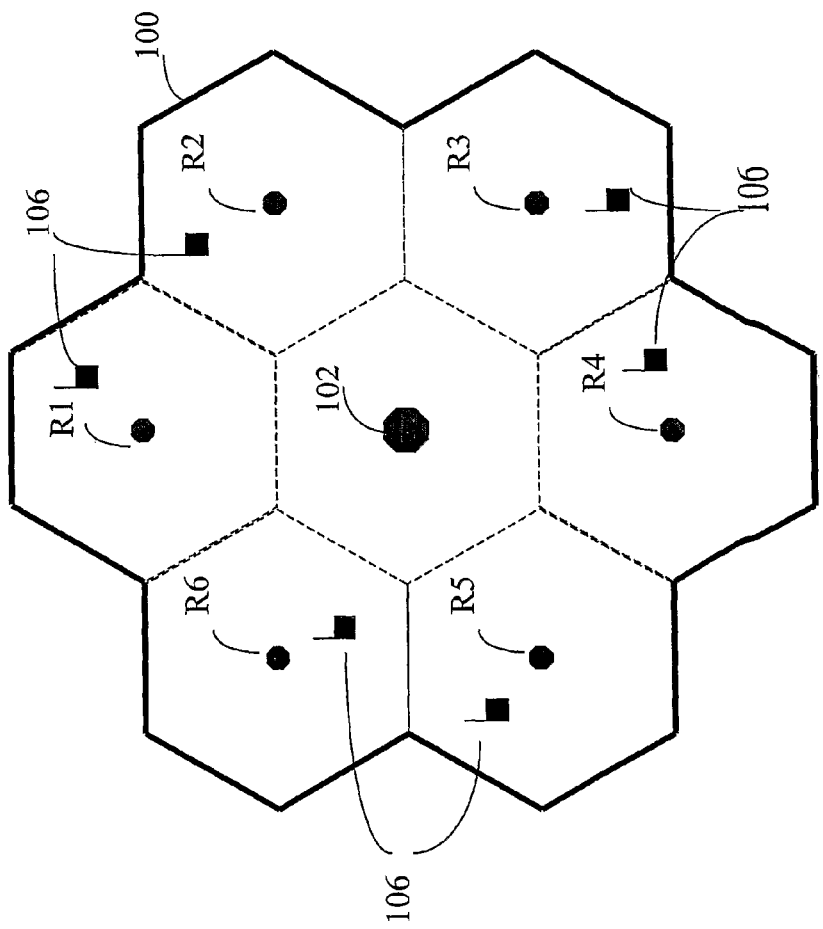
FIG. 15 is a diagram showing an exemplary scenario for RS-UE communication in the second time slot.
Figure 16:
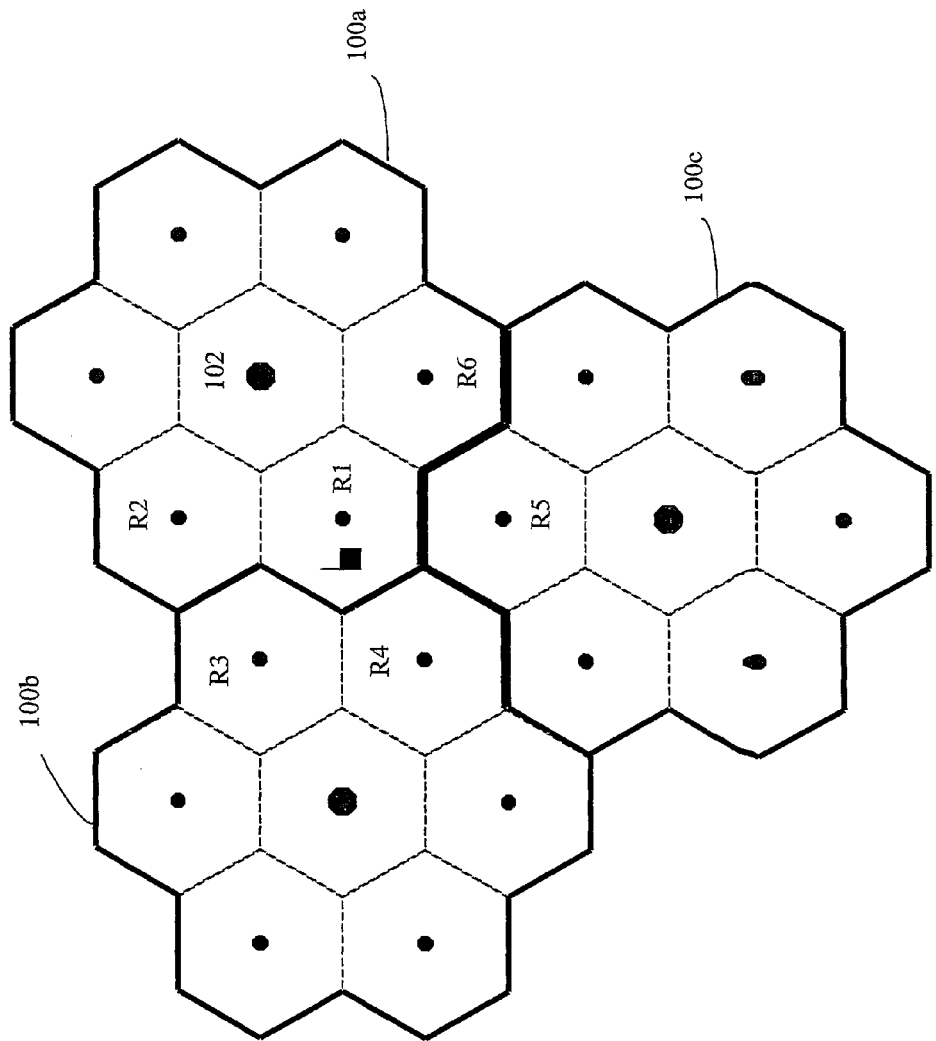
FIG. 16 is a diagram showing pathloss when the UE is in the relay station's coverage region.

FIG. 15 illustrates an exemplary scenario for RS-UE communication in TS2 where the user equipments 106 are in the coverage region of the relay stations. FIG. 16 illustrates an example of pathloss measurements to the two in-cell relay stations and the base station in the scenario of FIG. 15. In FIGS. 15-16, RS1-RS6 represent the relay stations (104 of FIG. 5) in the cell 100.

In FIG. 16, a relay station R1 communicates with a user equipment 106 in a cell 100a. There are six potential interferers: the serving base station of the cell 100a, two relay stations from the same cell (e.g. R2 and R6 of a cell 100a) and three relay stations from different cells (e.g. R3-R4 of a cell 100b and R5 of a cell 100c).

According to the conventional DFH, all the interferers need to report their transmission power level and resource utilization information (e.g., which FH pattern they are using in which time slot and at which power) to the base station which is going to assign resources for the user equipments as described by Kostic et al. ("Dynamic Frequency Hopping in Cellular Systems with Network Assisted Resource Allocation", in Proc. IEEE VTC 2000 Conference, Tokyo, Japan, May 2000).

Thus, the conventional DFH would require the base stations of different cells (e.g. 100a, 100b, 100c) to communicate with each other, since three of the interferers (e.g. R3-R4 of a cell 100b and R5 of a cell 100c) are in different cells.

However, as described above, the cell 100 is a decentralized system where communication and data transfer between different cells is minimized. Thus, the cell 100 utilizes the pathloss measurements implemented to the two in-cell replay stations and the base station in its cell (e.g. the serving base station 102 of the cell 100a and the relay stations R2 and R6 of the cell 100a in FIG. 16).

FIG. 17 shows system architecture for implementing the I-DFH under the scenario of FIG. 15. In FIG. 17, "270" represents in-cell relays (104 of FIG. 5) which has RS1-RS6, "242" represents landline network, "244" represents other relay stations outside the cell 100 (i.e. out-of-cell relay stations), and "246" represents other base stations. This is another example of possible scenarios, and the more general case, where the dominant interferers are not within the set of BS relays but may be from adjacent BSs or adjacent BS relays. In this case, interference avoidance will address the intra-cell interferers within the cell, while interference averaging is used to deal with the inter-cell interference.

The base station 102 has no coordination with the out-of-cell relay stations 244 and the out-of-cell base stations 246 for I-DFH.

To assign a new FH pattern, the base station 102 uses information on (i) Transmit power of the relay stations, (ii) Resource utilization information of the relay stations, (iii) Pathloss of the two in-cell relay stations (e.g. R2 and R6 in FIG. 16) and base station (e.g. 102 of the cell 100a in FIG. 16) to the user equipment 106.

Since in TS1, the base station 102 has assigned the resources to the relay stations RS1-RS6, and since the relay stations RS1-RS6 have a constant transmission power, the base station 102 already has the information (i) and (ii). The serving base station 102 has information for the relay station (e.g. R1 of FIG. 16) as well as its in-cell interferers (e.g. R2 and R6 of FIG. 16). The two in-cell relay stations (e.g. R2 and R6 of FIG. 16) do not need to report their resource utilization information to the base station 102.

The pathloss information (iii) will be received by the base station 102, either directly during TS1 or through the in-cell relays 140 (e.g. R1 of FIG. 16). In FIG. 17, this information is directly received by the base station 102 as an example.

The serving base station 102 knows, at which frequencies the SINR is below a threshold SINRth based on the measurements provided by the user equipment 106, so it attempts not to assign these frequencies to the user equipment 106. These frequencies are given a lower priority, preferably blocked, for that very frequency hop, as with DFH (interference avoidance).

For I-DFH, there is no communication between the three relay stations in the other cells (R3-R4 of the cell 100b and R5 of the cell 100c in FIG. 16) and the serving base station 102. The base station 102 does not obtain interference information from the other three out-of-cell relay stations (R3-R4 of the cell 100b and R5 of the cell 100c in FIG. 16). Thus, the base station 102 does not know the quality level at different frequencies in that hop. Therefore, it can assign any of the frequencies, in the order of highest to lowest priority as defined by the DFH part of the FH scheme. However, there is no guarantee that the quality of service (QoS) will be acceptable at those frequencies. The base station 102 does not have information on whether the out-of-cell interfering relay stations are using the frequencies that according to the results and calculations of the DFH part satisfy an SINR level above the threshold SINRth and are given the lower priority.

In one embodiment, in order to compensate the lack of this interference information from out-of-cell, I-DFH applies the Cyclic Frequency Hopping scheme (interference averaging) to the remaining (unblocked) frequencies. I-DFH employs a combination of DFH and CFH so as to leverage available knowledge within the cell, but compensate for the unavailable knowledge. For example, when it is identified that 32 frequencies out of 512 frequencies have not met a criterion (e.g. SINRth), 512−32 frequencies will be selected to form a CFH pattern.

Measurement modules 250 in the user equipment 106 implement pathloss measurements (i.e. measuring the signal strength of one or more pilots). The modules 250 make measurements of all the significant detectable pilots. In this case, pathloss of each of the serving base station and two in-cell relay stations (interferes) will be measured. Averaging modules 252 in the user equipment 106 average out Rayleigh fading based on the outputs from the modules 250 and transmits the pathloss reports to the base station via the uplink. The pathloss report may include the measured signal strength of the pilot and the identification of the pilot (i.e. identity of in-cell relay or base station associated with the pilot). The measurement modules 250 and the averaging modules 252 may be similar to the measurement modules 220 and the averaging modules 222 of FIG. 13, respectively.

A collection module 260 in the base station 102 collects pathloss reports from the user equipments 106 in the relay station neighborhood. The database 232 in the base station 102 records and manages FH patterns information of all of the user equipments 106 and the relay stations 270 in its cell.

Based on the reported measurements from the user equipments within the realm of the different relays, the module 234 in the base station 102 sets an SINR threshold SINRth, and prioritizes those frequencies above the threshold. A soft limit is placed on the use of frequencies below the threshold SINRth, with these frequencies being ordered from highest to lowest SINR. Frequencies with SINR measurements below the threshold SINRth will be given lower priority or eliminated for the given relay station or user equipment. Depending on buffer overloading, delay constraints, etc, these frequencies will be selected in the order of their priority.

Based on the reports from the different relay neighborhoods, the prioritized frequencies will be different for the different relay neighborhoods. A creation module 266 in the base station 102 creates new CFH patterns for the user equipments in the relay neighborhoods from the pool of available prioritized frequencies. The creation module 266 assigns the least interfered time slot and CFH pattern pair to the user equipment 106. The new patterns are stored in the database 232.

A notification module 268 notifies all relay stations RS1-RS6 in the in-cell relays 270 with the new CFH patterns for the user equipments 106 in the relay neighborhoods, and also notifies all relay stations RS1-RS6 with the new FH patterns to be used by them.

A receiving module 272 in the relay station of the in-cell relays 270 receives the new CFH pattern from the serving base station 102. A notification module 274 notifies the user equipments in its neighborhood with the new CFH patterns.

The base station 102 continuously monitors the performance of each user equipment 106 and reassigns another resource based on the performance report from the user equipments 106.

In the above description, the implementation of I-DFH on the downlink is described. The availability of relay pilot measurements, as well as the relatively static nature of the relays makes it practical to make changes to the frequency hopping patterns based on user equipment measurements of the relay pilots. On the uplink, a suboptimal configuration using the same frequency hopping pattern as on the downlink would still provide some coverage enhancement (Z. Kostic, and N. Sollenberger, Performance and Implementation of Dynamic Frequency Hopping in Limited-Bandwidth Cellular Systems, IEEE Transactions on Wireless Communications, Vol. 1, No. 1, January 2002).

An embodiment of I-DFH for the uplink includes the measurement of average interference on the frequency channels made by each intra-cell relay 270 in FIG. 17 when idle. These average interference measurements are reported to the BS entity 260, which then enables the BS entity 264 to use the reported measurements to refine the FH patterns in the BS entity 266 for the user equipments within each relay's neighborhood.

The interference management technique described above is applicable to cellular relay networks with very dense channel reuse, i.e., where channels are potentially reused in every sub-cell.

Since I-DFH method avoids non-timely information exchange among neighboring base stations, it can facilitate interference management/avoidance in a network utilizing an aggressive channel reuse of one.

I-DFH can be used in cellular fixed relay networks, which are envisaged for 4 G wireless systems, wherein a base station controls the operation of a number of relay stations in its service area.

By using I-DFH as an interference management/avoidance technique, the same channel can be reused many times in each cell (by relay stations) thereby boosting the cell capacity/throughput.

In the above description only the first tier of transmitters (relay stations and/or base stations) is considered as interferes. However, as will be apparent to one of skill in the art, the approach for two or more tiers of interferers is similar. In general, the first tier interferers are the most significant. If all these are within the base station domain, then it is possible for the base station to have the significant interference information from the relays within its domain and employ interference avoidance (DFH) more effectively. Second tier interferers will come from other cells. The interference from these can be mitigated by interference averaging (e.g. CFH) based on the relay pilots information or reports from the user equipments 106.

In the above description, the relaying is implemented through the fixed relay stations 104. However, the user equipments 106 may act as relay stations. In this case, I-DFH descried above is applicable to slow moving user equipments acting as relays.

All citations are hereby incorporated by reference.

The capacity and coverage enhancement mechanism of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements, which may be embedded in a carrier wave may be transmitted via a communication network. Such a computer readable memory and a computer data signal and/or its carrier are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A method for capacity and coverage enhancement in a wireless network including a plurality of cells, at least one cell having at least one base station and a plurality of relay stations, the base station communicating with one or more user equipments in the cell directly or through one or more relay stations in the cell, the method comprising:
    collecting, by at least one base station in a cell of the plurality of cells, from a first user equipment in the cell interference information identifying pathloss information between the user equipment and one or more relay stations in the cell determined by the user equipment;
    determining, based at least in part on the interference information, one or more noisy frequency channels or sub-channels on which interference is most severe;
    dynamically generating a frequency hopping (FH) pattern that identifies a plurality of frequency channels or sub-channels for the first user equipment based on the one or more noisy frequency channels or sub-channels, wherein no noisy frequency channel or subchannel is used in the FH pattern; and
    allocating one or more type slot types in a plurality of time slot types of the cell, wherein at least one time slot type comprises a time slot type where the base station operates at a low transmit power mode and transmits data to a second user equipment in a neighborhood of the base station, and at least one of the relay station transmits data to the first user equipment in a neighborhood of the relay station.

2. The method according to claim 1, wherein the step of dynamically generating the FH pattern comprises:
    selectively implementing interference avoidance, interference averaging, or a combination thereof, based on the interference information.

3. The method according to claim 1, wherein dynamically generating the FH pattern comprises:
    prioritizing frequencies above a performance criterion based on the interference information for each relay station and the base station; and
    generating the FH pattern from a set of prioritized frequencies independently for use in each relay station neighborhood.

4. The method according to claim 1, wherein dynamically generating the FH pattern comprises:
    prioritizing frequencies above a performance criterion based on the interference information for each relay station and the base station; and
    generating the FH pattern using the prioritized frequencies, when possible interference includes inter-cell interference.

5. The method according to claim 1, further comprising:
    at the user equipment, monitoring pathloss and reporting the pathloss information associated with the pathloss, and wherein collecting further comprises collecting the pathloss information through an uplink.

6. A network system for a wireless network including a cell, the cell having a plurality of relay stations, comprising:

a base station comprising:
    a module for collecting pathloss information between a first user equipment in the cell and at least one relay station in the cell, the pathloss information determined by the first user equipment;
    a module for identifying, based on the pathloss information, one or more noisy frequency channels or sub-channels on which interference is significant;
    a module for generating a frequency hopping (FH) pattern for the first user equipment in the cell based on the one or more noisy frequency channels or subchannels, wherein no noisy frequency channel or sub-channel is used in the FH pattern; and
    a scheduler for scheduling operation of the cell, wherein the operation of the cell is divided into a plurality of time slot types, the plurality of time slot types comprise a time slot type where the base station operates at a low transmit power mode and transmits data to a second user equipment in a neighborhood of the base station, and at least one of the relay stations transmits data to the first user equipment in a neighborhood of the relay station.

7. The network system according to claim 6, wherein the generating module prioritizes frequencies above a performance criterion based on the pathloss information monitored over a range of relevant frequencies for at least one of the relay stations and the base station, and generates the FH pattern independently for use in at least one relay station neighborhood.

8. The network system according to claim 7, wherein the generating module generates the FH pattern using the frequencies which are prioritized, when possible interference includes inter-cell interference.

9. The network system according to claim 7, wherein the performance criterion includes a Signal to Interference and Noise Ratio (SINR) threshold.

10. The network system according to claim 6, wherein the scheduler allows the base station and at least one of the relay station to be in a master-slave relation.

11. The network system according to claim 6, wherein the plurality of time slot types includes a further time slot type wherein the base station operates at a high transmit power mode and transmits to at least one of the relay stations data directed to the first user equipment, and at least one relay station receives the data from the base station.

12. The network system according to claim 11, wherein the base station transmits control and signaling messages directly to all user equipments in the cell in the further time slot type.

13. The method of claim 1, further comprising sending, by the base station, data to the first user equipment using the FH pattern without any transmission coordination between different cells of the plurality of cells.

14. The method of claim 1, wherein the first user equipment is exposed to transmissions from at least one relay station disposed in a second cell of the plurality of cells, and wherein the pathloss information comprises only pathloss information from one or more of the relay stations in the first cell.

15. The method of claim 14, wherein the first user equipment accesses data stored at the first user equipment to identify the one or more relay stations in the first cell.

16. The method of claim 1, wherein at least one frequency channel or sub-channel of the plurality of frequency channels or sub-channels in the FH pattern differs from at least one frequency channel or sub-channel in an immediately previous FH pattern used to send data from the first base station to the first user equipment.

17. The method of claim 1, wherein the FH pattern comprises a predetermined number of frequency channels or sub-channels, and the method further comprising:
    maintaining a first pool of frequency channels or sub-channels comprising of unblocked frequency channels or sub-channels and a second pool of frequency channels or sub-channels comprising of blocked frequency channels or sub-channels, the blocked frequency channels or sub-channels comprising the one or more noisy frequency channels or sub-channels,
    and wherein dynamically generating the frequency hopping (FH) pattern that identifies the plurality of frequency channels or sub-channels for the first user equipment based on the one or more blocked frequency channels or sub-channels further comprises:
        dynamically generating the frequency hopping (FH) pattern that identifies the plurality of frequency channels or sub-channels for the first user equipment by selecting a predetermined number of frequency channels or sub-channels randomly from the first pool.

18. A method for communicating with a user equipment in a cell having a base station and a plurality of relay stations, the method, comprising:
    communicating, between the base station and the user equipment, via at least one relay station, first data using a first frequency hopping (FH) pattern that identifies a first plurality of frequencies;
    subsequently receiving, by the base station, pathloss information determined by the user equipment, the pathloss information identifying pathloss between the user equipment and one or more relay stations of the plurality of relay stations, including the at least one relay station;
    based at least in part on the pathloss information, identifying, by the base station, a set of noisy frequencies that fail to meet a predetermined criterion;
    generating a new FH pattern comprising a second plurality of frequencies selected from a pool of frequencies that does not include the set of noisy frequencies, wherein at least one of the second plurality of frequencies in the new FH pattern differs from at least one of the first plurality of frequencies in the first FH pattern; and
    communicating, between the base station and the user equipment, via a relay station of the plurality of relay stations, second data using the new FH pattern, wherein the communication occurs in a time slot type where the base station operates at a low transmit power mode and transmits data to at least one other user equipment in a neighborhood of the base station, and at least one of the relay station transmits data to the user equipment in a neighborhood of the relay station.

19. The method according to claim 1, wherein the plurality of time slot types includes a further time slot type, wherein the base station transmits control and signaling messages directly to all user equipments in the cell in the further time slot type.

* * * * *